United States Patent
Maetaki

(10) Patent No.: US 11,092,778 B2
(45) Date of Patent: Aug. 17, 2021

(54) OPTICAL SYSTEM AND IMAGE PICKUP APPARATUS

(71) Applicant: CANON KABUSHIKI KAISHA, Tokyo (JP)

(72) Inventor: Satoshi Maetaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 178 days.

(21) Appl. No.: 16/457,426

(22) Filed: Jun. 28, 2019

(65) Prior Publication Data

US 2020/0012073 A1   Jan. 9, 2020

(30) Foreign Application Priority Data

Jul. 4, 2018 (JP) .............................. JP2018-127359

(51) Int. Cl.
G02B 9/06 (2006.01)
G02B 9/64 (2006.01)
G02B 7/04 (2021.01)

(52) U.S. Cl.
CPC ........ *G02B 9/64* (2013.01); *G02B 7/04* (2013.01)

(58) Field of Classification Search
CPC .............. G02B 7/04; G02B 9/64; G02B 9/06
USPC ................................................. 359/754, 794
See application file for complete search history.

(56) References Cited

U.S. PATENT DOCUMENTS

| 4,534,626 A * | 8/1985 | Mihara .................. G02B 13/02 359/745 |
| 6,028,720 A * | 2/2000 | Wartmann ............. G02B 13/06 359/754 |
| 7,948,691 B2 * | 5/2011 | Okumura ........... G02B 27/0025 359/754 |
| 9,703,072 B2 * | 7/2017 | Martin ..................... G02B 7/10 |
| 2011/0090576 A1 * | 4/2011 | Sugita ................ G02B 27/0025 359/754 |
| 2011/0299179 A1 * | 12/2011 | Maetaki ................. G02B 13/16 359/754 |
| 2013/0063648 A1 * | 3/2013 | Koga ....................... G02B 9/64 348/340 |
| 2016/0070086 A1 * | 3/2016 | Martin ............... G02B 27/0025 359/708 |
| 2018/0024315 A1 | 1/2018 | Sato |

FOREIGN PATENT DOCUMENTS

| CN | 1849545 A | 10/2006 |
| CN | 101510002 A | 8/2009 |
| EP | 2287649 A1 | 2/2011 |
| JP | 2011248379 A | 12/2011 |

* cited by examiner

*Primary Examiner* — William R Alexander
(74) *Attorney, Agent, or Firm* — Canon U.S.A., Inc. IP Division

(57) ABSTRACT

An optical system according to an example embodiment includes a first lens unit that has a positive refractive power, and a second lens unit that is disposed on an image side of the first lens unit and that has a positive refractive power. The second lens unit moves when focusing from infinity to an object at near distance. The second lens unit includes, disposed in order from the object side towards an image side, a first positive lens, an aperture stop, and a second positive lens. Anomalous partial dispersibilities of the first positive lens and the second positive lens are defined.

21 Claims, 19 Drawing Sheets

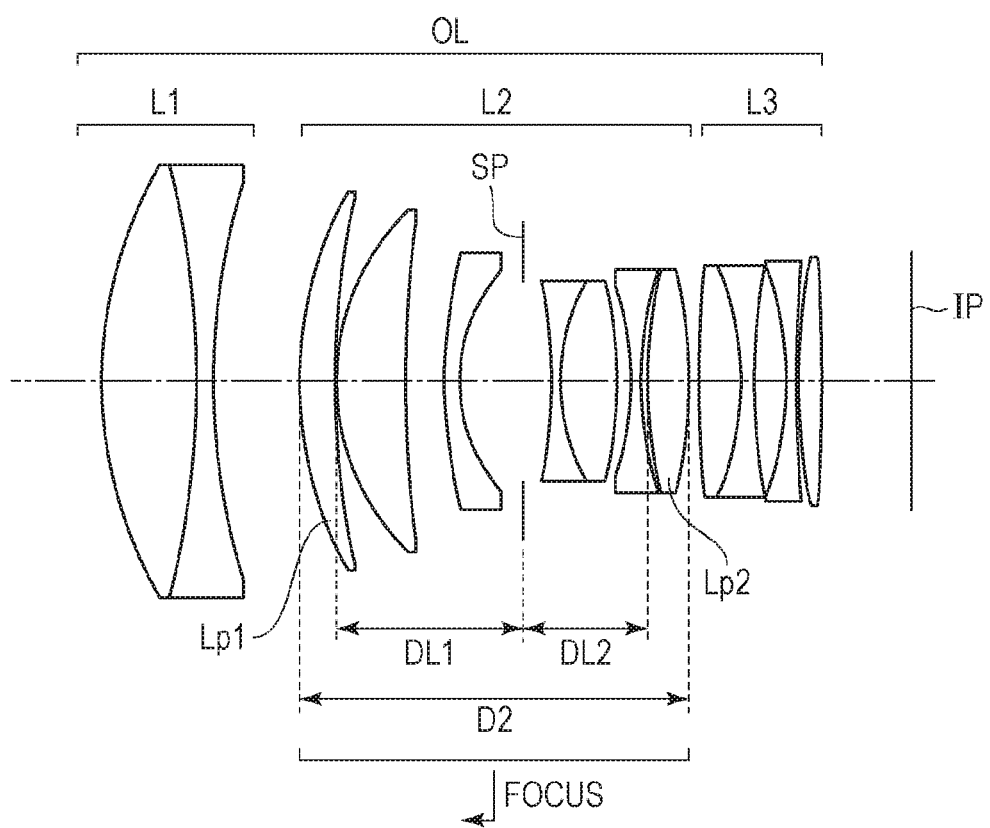

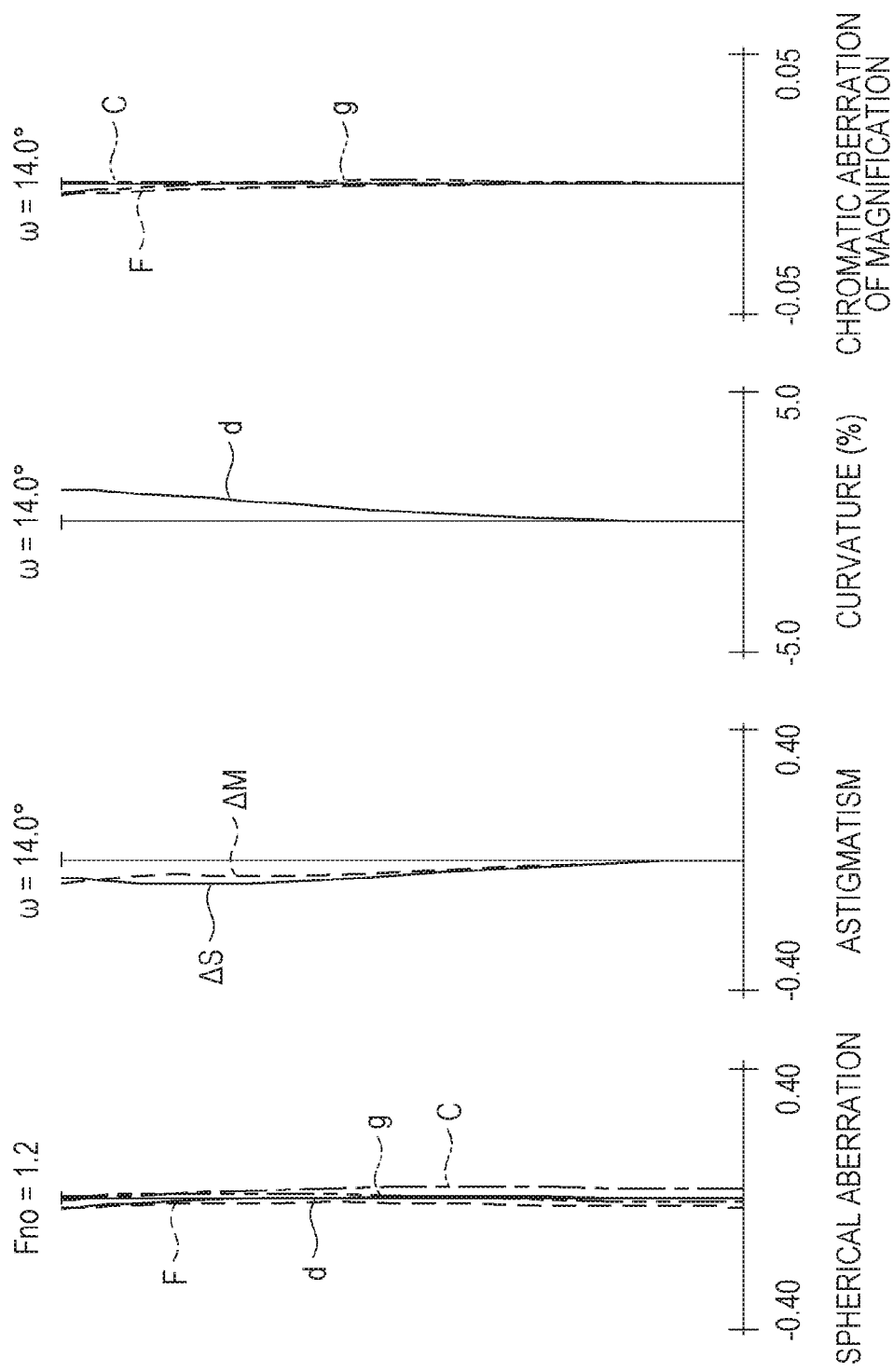

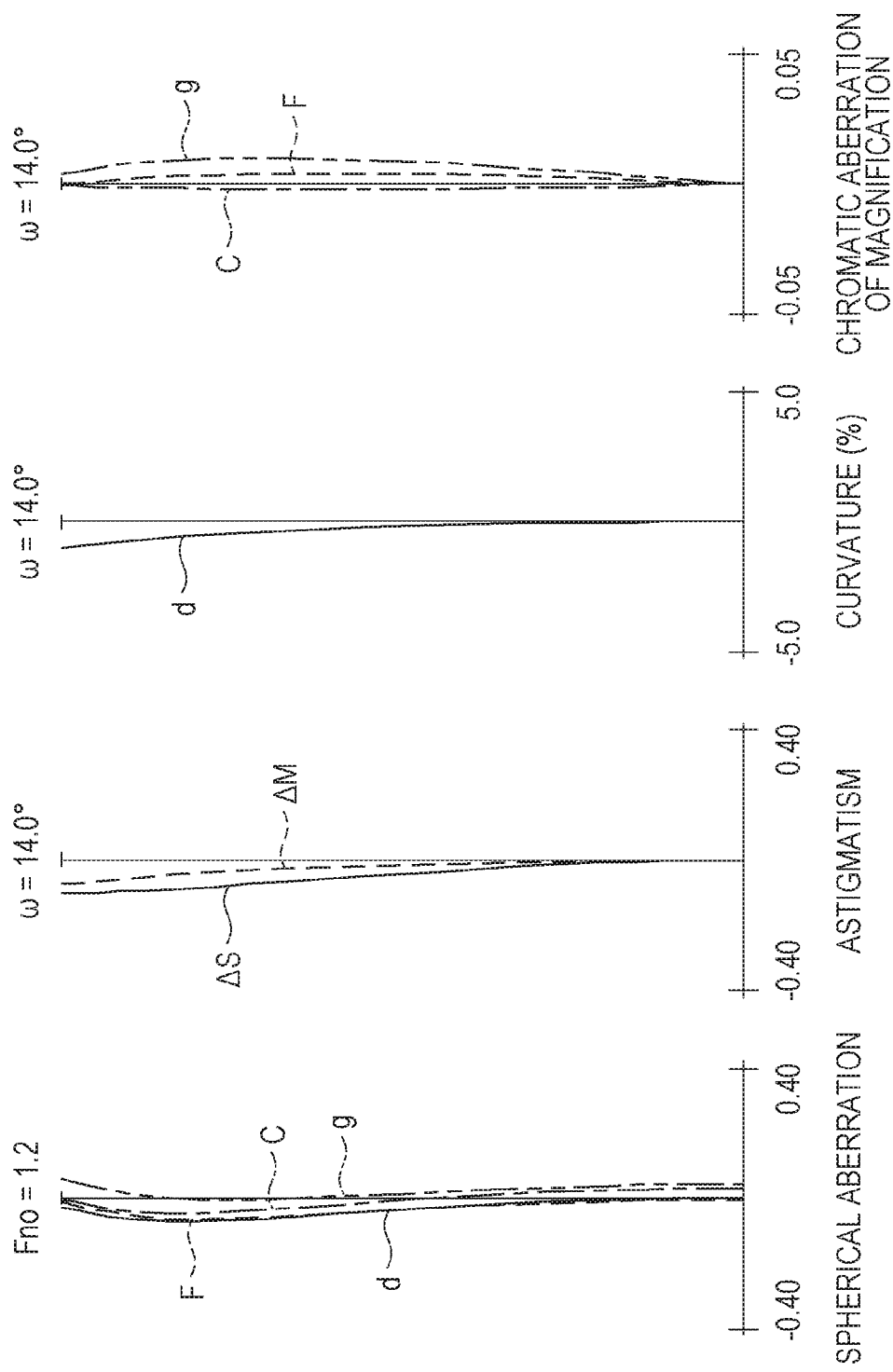

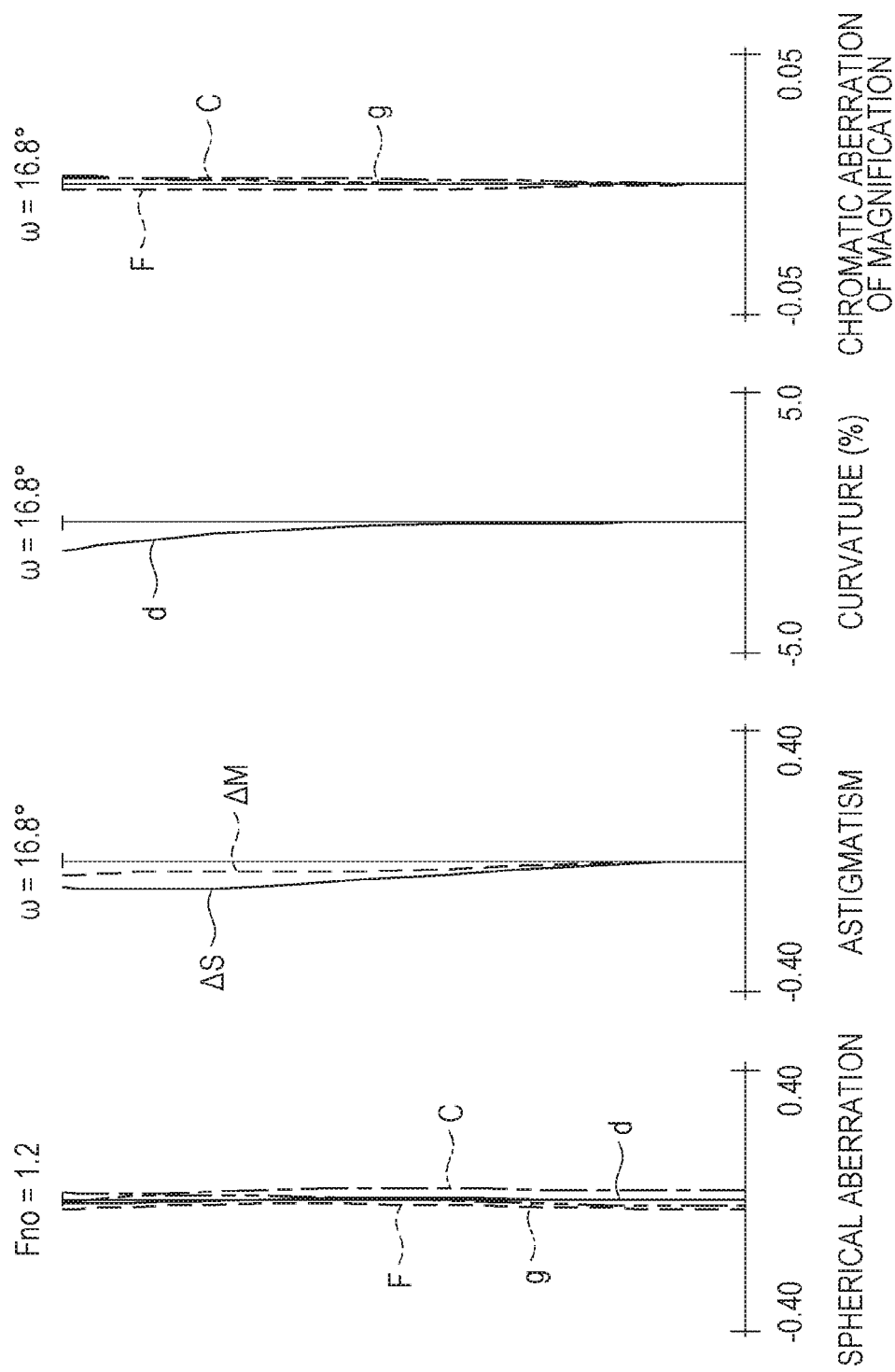

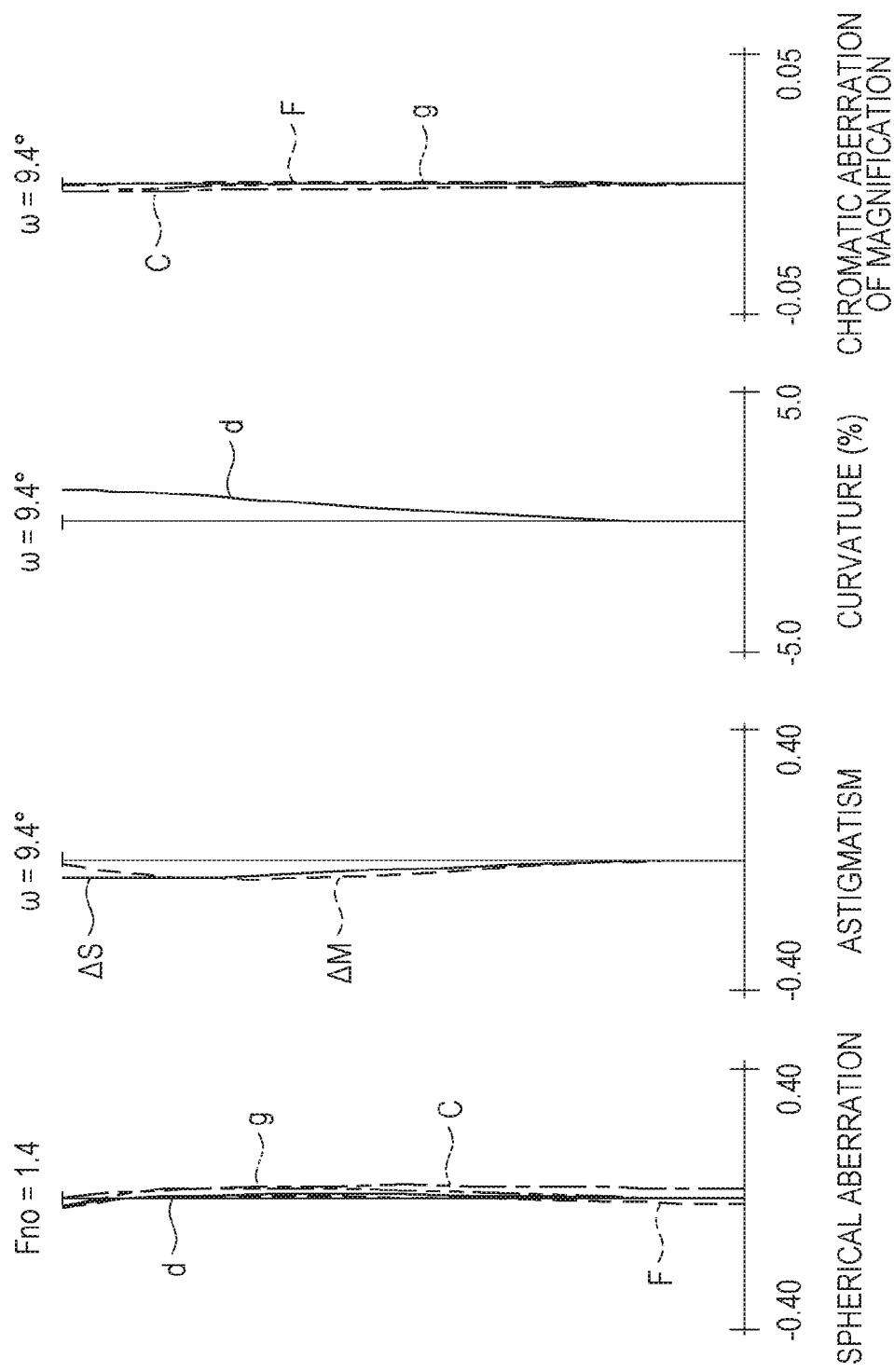

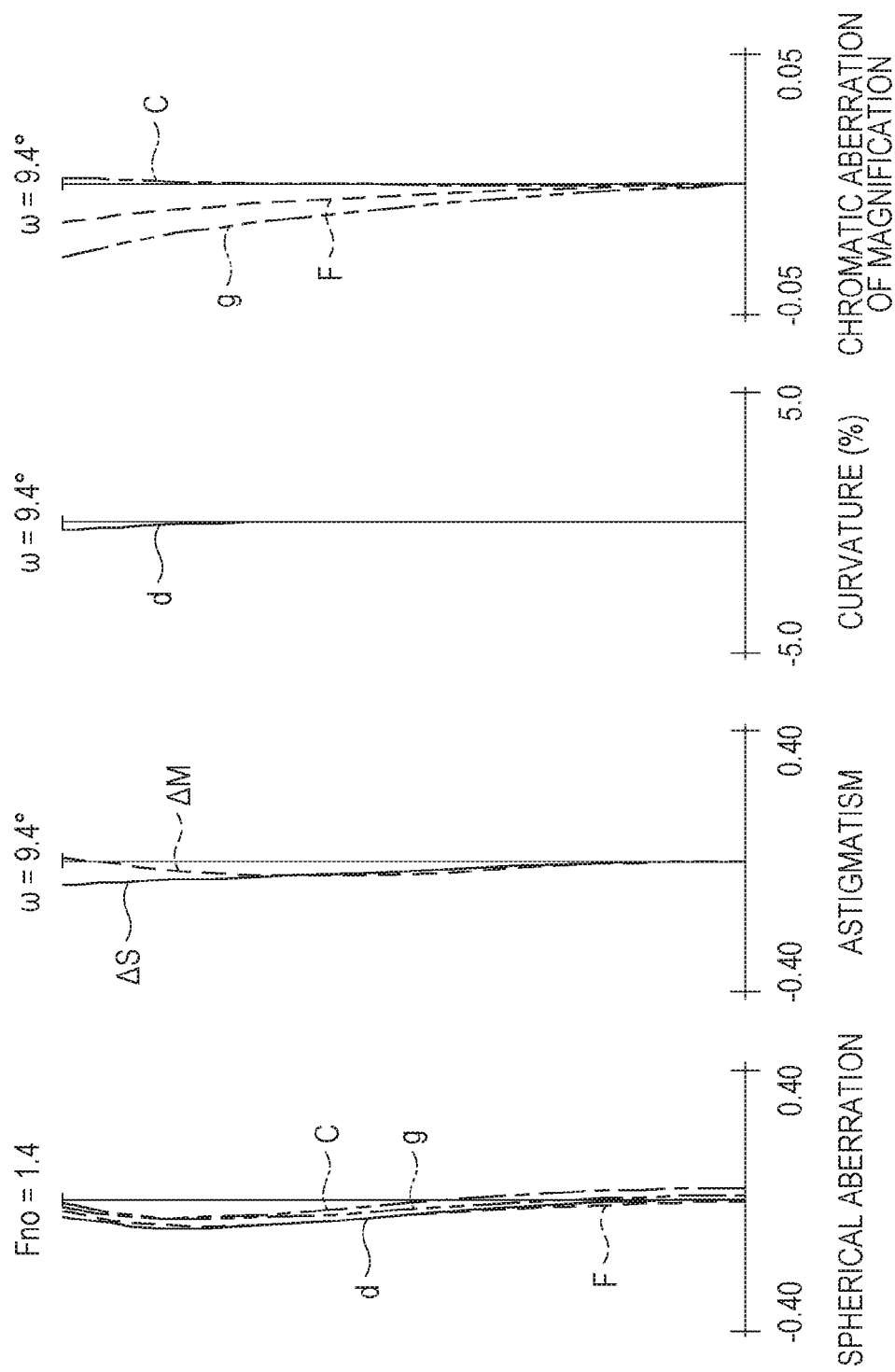

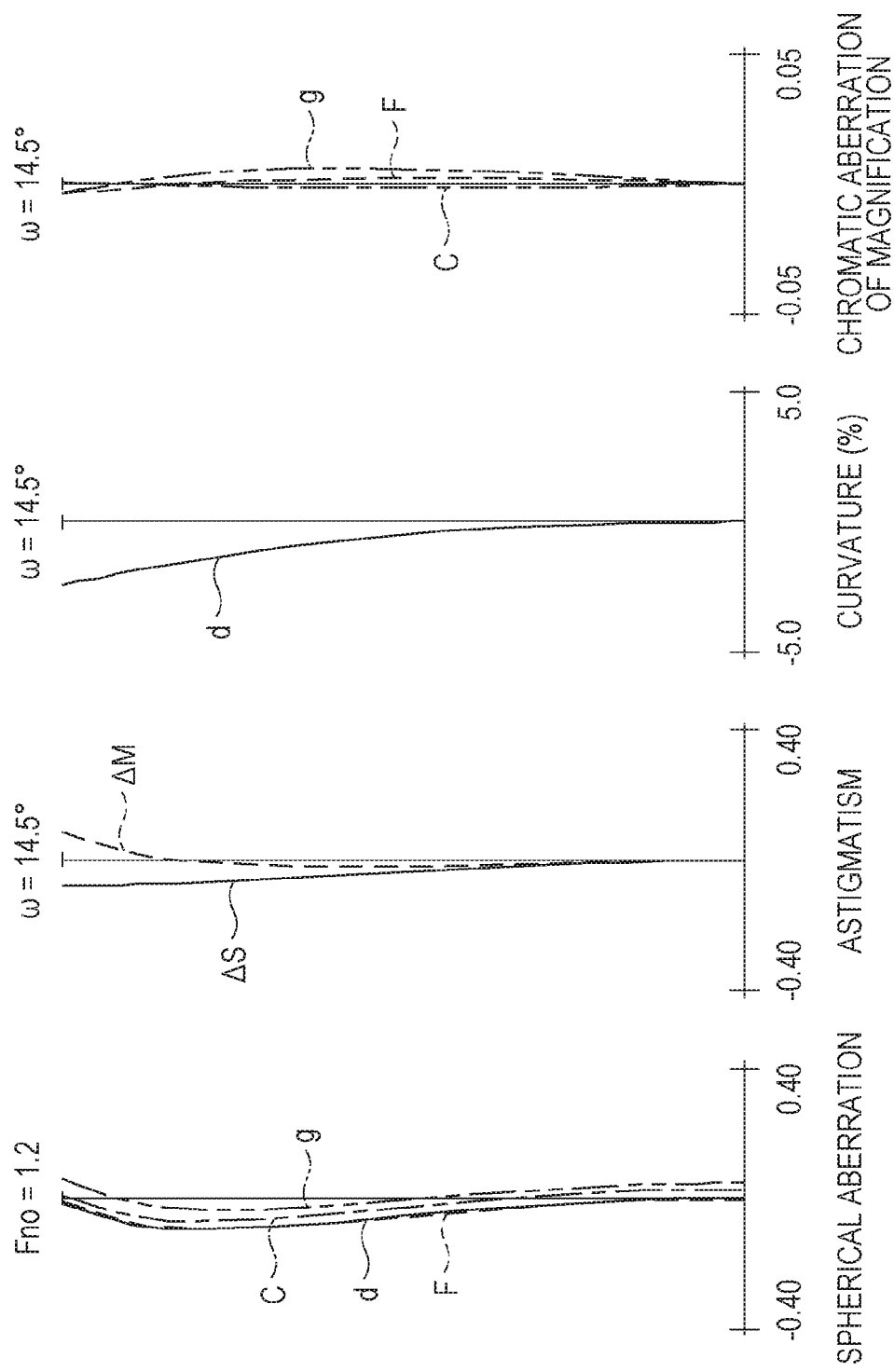

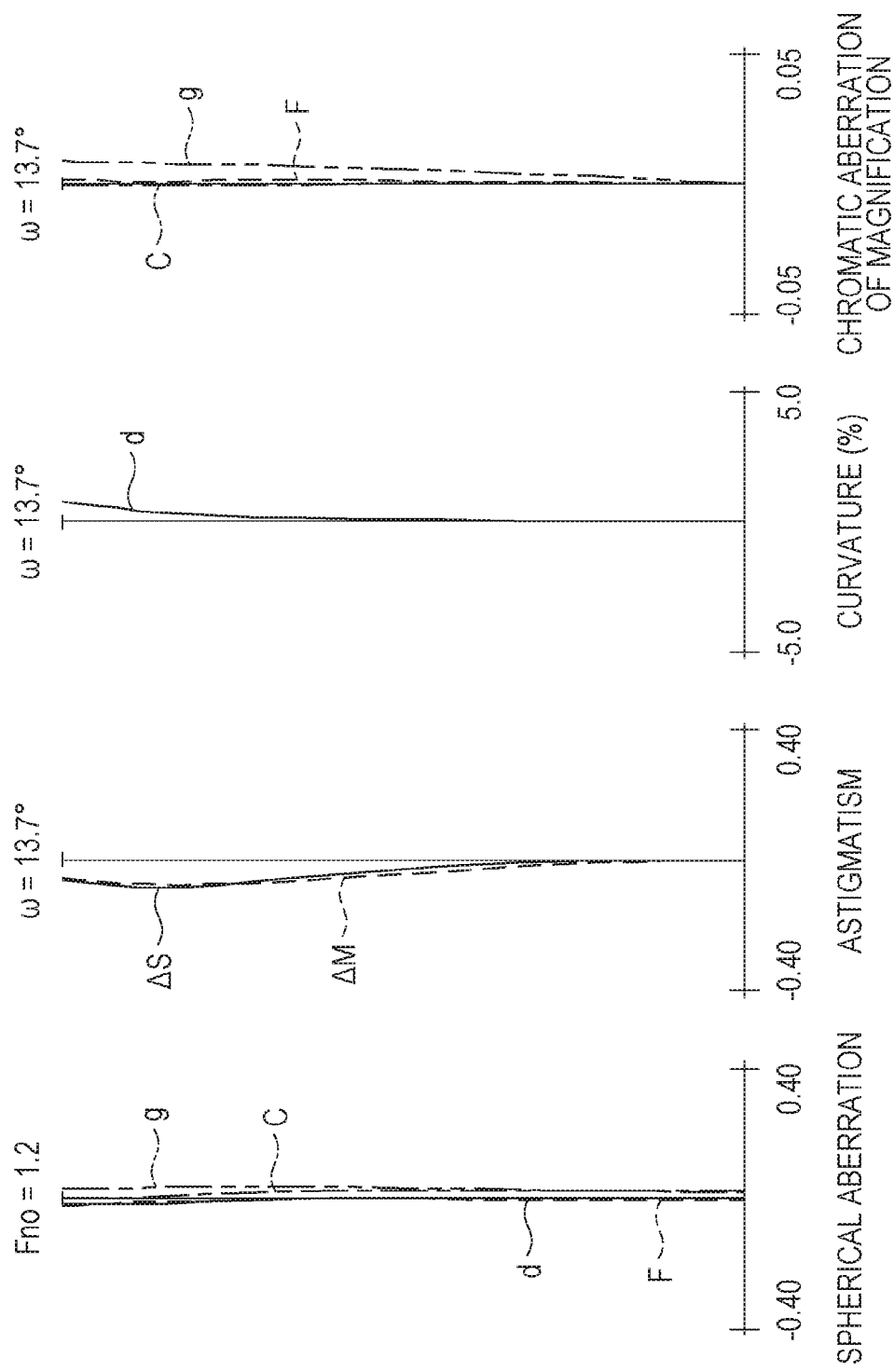

OPTICAL SYSTEM AND IMAGE PICKUP APPARATUS

BACKGROUND OF THE INVENTION

Field of the Invention

The aspect of the embodiments relates to an optical system and an image pickup apparatus.

Description of the Related Art

An image pickup optical system that has a small (bright) F-number, that is small in size, and that has high optical performance is in need as an image pickup optical system used in an image pickup apparatus such as a digital camera or a film camera.

Typically, as the overall lens length of the image pickup optical system becomes shortened, the refractive power of each lens becomes stronger, and chromatic aberrations, such as the on-axis chromatic aberration and the chromatic aberration of magnification, increase, and the optical performance tends to become degraded. Furthermore, as the F-number becomes smaller, since the depth of field becomes shallower, the effect that the various aberrations have on the image quality becomes larger.

In a large aperture ratio optical system, in many cases, a lens unit having a relatively strong positive refractive power is disposed on the object side to converge the light flux. However, in the above lens unit, the position in the lens unit through which a paraxial marginal light flux passes is high; accordingly, on-axis chromatic aberration is likely to occur in a large aperture ratio optical system.

US2018/0024315 discloses an optical system including a first lens unit having a positive refractive power, a second lens unit having a positive refractive power, and a third lens unit having a positive refractive power, in which a lens formed of a material having anomalous partial dispersibility is disposed relatively on an object side.

A material having anomalous partial dispersibility that is effective in correcting chromatic aberration is, depending on the disposed position, capable of correcting chromatic aberration of magnification. However, as in US2018/0024315, when a lens formed of a material having anomalous partial dispersibility is used at a position where the positive refractive power is strong, the chromatic aberration of magnification tends to become corrected excessively.

SUMMARY OF THE INVENTION

An optical system according to an aspect of the embodiments includes a first lens unit that has a positive refractive power, and a second lens unit that has a positive refractive power. In the optical system, a distance between adjacent lens units changes during focusing, the second lens unit moves towards an object side during focusing from infinity to an object at near distance, the second lens unit includes, disposed in order from the object side towards an image side, a first positive lens, an aperture stop, and a second positive lens. When an anomalous partial dispersibility $\Delta\theta gF$ of a material is represented, using an Abbe constant $vd$ of the material, and a partial dispersion ratio $\theta gF$ of the material, by $$\Delta\theta gF = \theta gF - (-1.665\times 10^{-7}\times vd^3 + 5.213\times 10^{-5}\times vd^2 - 5.656\times 10^{-3}\times vd + 7.278\times 10^{-1}),$$

the following conditional expressions are satisfied:

$$0.0050 < \Delta\theta gF1 < 0.40; \text{ and}$$

$$0.0050 < \Delta\theta gF2 < 0.40$$

where $\Delta\theta gF1$ is an anomalous partial dispersibility of a material of the first positive lens, and $\Delta\theta gF2$ is an anomalous partial dispersibility of a material of the second positive lens.

Further features of the disclosure will become apparent from the following description of exemplary embodiments with reference to the attached drawings.

BRIEF DESCRIPTION OF THE DRAWINGS

FIG. 1 is a cross-sectional view of an optical system of a first example embodiment.

FIG. 2A is a longitudinal aberration drawing when the optical system is focused to infinity.

FIG. 2B is a longitudinal aberration drawing when the optical system is focused to an object at closest distance.

FIG. 4A is a longitudinal aberration drawing when the optical system is focused to infinity.

FIG. 8A is a longitudinal aberration drawing when the optical system is focused to infinity.

FIG. 8B is a longitudinal aberration drawing when the optical system is focused to an object at closest distance.

FIG. 10B is a longitudinal aberration drawing when the optical system is focused to an object at closest distance.

FIG. 12A is a longitudinal aberration drawing when the optical system is focused to infinity.

DESCRIPTION OF THE EMBODIMENTS

Figure 3:
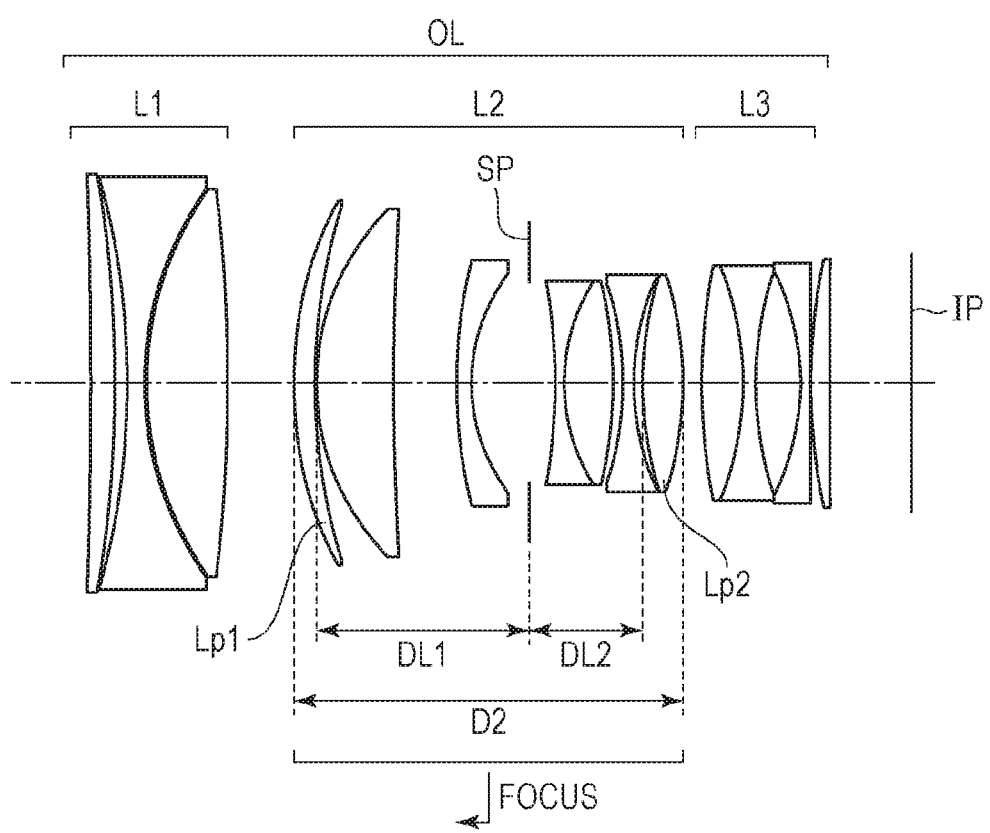
FIG. 3 is a cross-sectional view of an optical system of a second example embodiment.

Hereinafter, an optical system and an image pickup apparatus according to example embodiments of the disclosure will be described in detail with reference to the attached drawings.

Note that in the present specification, "back focus" refers to a distance on an optical axis from a final surface (a lens surface closest to the image) of the optical system to a paraxial image plane expressed in air conversion length. An "overall lens length" is a length obtained by adding the back focus to a distance on the optical axis between a most frontal surface (a lens surface closest to the object) of the optical system and a final surface. Not limited to a configuration including a plurality of lens, a "lens unit" includes a configuration including a single lens. Furthermore, when "chromatic aberration" is described without any distinction between the on-axis chromatic aberration and the chromatic aberration of magnification, the "chromatic aberration" is to include both the on-axis chromatic aberration and the chromatic aberration of magnification.

The optical system in each example embodiment is an image pickup optical system used in an image pickup apparatus such as a digital video camera, a digital camera, a silver-halide film camera, or a television camera. In the cross-sectional views of the optical systems illustrated in FIGS. 1, 3, 5, 7, 9, and 11, the left side is the object side (the front side) and the right side is the image side (the rear side). Furthermore, in each of the cross-sectional views, assuming that i is the order of the lens unit from the object side towards the image side, Li denotes an $i^{th}$ lens unit. Furthermore, an aperture stop SP determines (limits) the light flux of a full aperture F-number (Fno). During focusing from infinity to an object at near distance, a focus lens unit moves in a manner depicted by an arrow in each drawing. With the above, the distance between adjacent lens units changes.

When the optical system of each example embodiment is used in a digital video camera or a digital camera, an image plane IP corresponds to an image pickup element (a photo-electric transducer) such as a CCD sensor or a CMOS sensor. When the optical system of each example embodiment is used in a silver-halide film camera, the image plane IP corresponds to a film plane.

FIGS. 2A, 2B, 4A, 4B, 6A, 6B, 8A, 8B, 10A, 10B, 12A, and 12B are aberration diagrams of the optical system of each example embodiment described later. In each spherical aberration diagram, a solid line depicts a d-line (wavelength 587.6 nm), a broken line depicts an F-line (wavelength 486.1 nm), a dot-dash-line depicts a C-line (wavelength 656.3 nm), and a two-dot chain line depicts a g-line (wavelength 435.8 nm). In each astigmatism diagram, a broken line $\Delta M$ depicts a meridional image plane and a solid line $\Delta S$ depicts a sagittal image plane. Each distortion aberration depicts a d-line. Each chromatic aberration of magnification depicts an F-line, a C-line, and a g-line. Sign ω denotes a half field angle (degrees), and Fno denotes an F-number.

An optical system of an example embodiment of the disclosure includes a first lens unit that has a positive refractive power and a second lens unit that is disposed on the image side of the first lens unit and that has a positive refractive power. The above optical system is an optical system in which a distance between adjacent lens units change during focusing. During focusing from infinity to an object at near distance, the second lens unit moves towards the object side.

In a large aperture ratio optical system having such a configuration, in order to correct the on-axis chromatic aberration and the chromatic aberration of magnification, a positive lens formed of a material having anomalous partial dispersibility at a position where the passing position of the paraxial marginal ray is high is disposed. On the other hand, when the above first positive lens is disposed on the object side with respect to the aperture stop, while the on-axis chromatic aberration can be corrected favorably, in many cases, the chromatic aberration of magnification is corrected excessively. Furthermore, in the case of a large aperture ratio optical system, chromatic aberration fluctuation is likely to occur during focusing from infinity to near distance.

Accordingly, in an optical system of an example embodiment of the disclosure, in addition to disposing a positive lens (hereinafter, referred to as a first positive lens) formed of a material having anomalous partial dispersibility on the object side of the aperture stop, a positive lens (hereinafter, referred to as a second positive lens) formed of a material having anomalous partial dispersibility is also disposed on the image side of the aperture stop. In other words, by providing the first positive lens, the aperture stop, and the second positive lens disposed in that order from the object side towards the image side, symmetry in the arrangement of the positive lenses in front of and behind the aperture stop is increased. With the above, at least a portion of the chromatic aberration of magnification that has been corrected excessively due to the action of the first positive lens can be canceled towards reducing the chromatic aberration of magnification with the action of the second positive lens.

Furthermore, the first positive lens, the aperture stop, and the second positive lens described above are disposed in the second lens unit that moves during focusing from infinity to an object at near distance. Since on-axis chromatic aberration and chromatic aberration of magnification can be reduced in the second lens unit with the above, chromatic aberration fluctuation during focusing can be reduced.

More specifically, the first positive lens and the second positive lens satisfy the following conditional expressions (1) and (2), $$0.0050 < \Delta\theta gF1 < 0.40 \quad (1)$$

$$0.0050 < \Delta\theta gF2 < 0.40 \quad (2)$$

where $\Delta\theta gF1$ is the anomalous partial dispersibility of the material of the first positive lens, and $\Delta\theta gF2$ is the anomalous partial dispersibility of the material of the second positive lens.

Definitions of the anomalous partial dispersibilities $\Delta\theta gF1$ and $\Delta\theta gF2$ of the materials in conditional expressions (1) and (2) will be given. Refractive indexes of the materials for the g-line (435.8 nm), the F-line (486.1 nm), the d-line (587.6 nm), and the C-line (656.3 nm) are Ng, NF, Nd, and NC, respectively. In the above, the Abbe constant νd, the partial dispersion ratio θgF, and the anomalous partial dispersibility $\Delta\theta gF$ of the materials are expressed by the following expressions (a) to (c).

$$\nu d = (Nd-1)/(NF-NC) \quad (a)$$

$$\theta gF = (Ng-NF)/(NF-NC) \quad (b)$$

$$\Delta\theta gF = \theta gF - (-1.665 \times 10^{-7} \times \nu d^3 + 5.213 \times 10^{-5} \times \nu d^2 - 5.656 \times 10^{-3} \times \nu d + 7.278 \times 10^{-1}) \quad (c)$$

Since the correction of the on-axis chromatic aberration becomes insufficient, it is not desirable that the value of conditional expression (1) falls below the lower limit and the anomalous partial dispersibility of the first positive lens becomes low. If the value of conditional expression (1) exceeds the upper limit and the anomalous partial dispersibility of the first positive lens becomes high, the degree of overcorrection becomes large such that the overcorrection of the chromatic aberration of magnification cannot be sufficiently canceled even when using the second positive lens. The above is not desirable since the correction of the chromatic aberration of magnification of the system as a whole becomes excessive.

If the value of conditional expression (2) falls below the lower limit and the anomalous partial dispersibility of the second positive lens becomes low, the chromatic aberration of magnification that has been corrected excessively by the first positive lens cannot be canceled sufficiently. The above is not desirable since the correction of the chromatic aberration of magnification of the system as a whole becomes excessive. It is not desirable that the value of conditional expression (2) exceeds the upper limit and the anomalous partial dispersibility becomes high since the chromatic aberration of magnification that has been corrected excessively by the first positive lens will be corrected more than the excessively corrected amount and the correction of the chromatic aberration of magnification of the system as a whole becomes insufficient.

As described above, by satisfying the configuration of the lens unit described above and conditional expressions (1) and (2), the optical system according to an example embodiment of the disclosure is capable of obtaining a high optical performance in which various chromatic aberrations including the chromatic aberration are favorably corrected throughout the entire object length.

Note that, in one embodiment, the numerical ranges of conditional expressions (1) and (2) are set in the following ranges.

$$0.0050 < \Delta\theta gF1 < 0.100 \quad (1a)$$

$$0.0050 < \Delta\theta gF2 < 0.150 \quad (2a)$$

In another embodiment, the numerical ranges of conditional expressions (1) and (2) are set in the following ranges.

$$0.0060 < \Delta\theta gF1 < 0.010 \quad (1b)$$

$$0.0300 < \Delta\theta gF2 < 0.100 \quad (2b)$$

The optical system may further include a third lens unit having a positive or negative refractive power, which is disposed on the image side with respect to the second lens unit. For example, in a case in which the third lens unit is immobile during focusing, the second lens unit can be reduced in weight and prompt focusing will be possible.

Furthermore, in one embodiment, the third lens unit has a positive refractive power. With the above, it will be possible to reduce the angle incident on the image plane IP and it will be possible to obtain a favorable imaging result regardless of the characteristics of the image pickup element disposed at the image plane IP regarding the ray incident.

Furthermore, in another embodiment, the optical system satisfies at least one of the conditional expressions below.

$$0.50 < DL1/DL2 < 3.00 \quad (3)$$

$$1.80 < nd1 < 2.40 \quad (4)$$

$$-5.00 < h1\hat{\ }/h2\hat{\ } < -0.50 \quad (5)$$

$$-20.00 < (h1 \times h1\hat{\ }/vd1/fp1 \times \Delta\theta gF1)/(h2 \times h2\hat{\ }/vd2/fp2 \times \Delta\theta gF2) < -0.10 \quad (6)$$

$$0.00 < vd1 < 30.0 \quad (7)$$

$$0.00 < vd2 < 30.0 \quad (8)$$

$$0.00 < DL1/f < 1.00 \quad (9)$$

$$0.00 < DL2/f < 1.00 \quad (10)$$

$$0.00 < DL1/D2 < 0.80 \quad (11)$$

$$0.00 < DL2/D2 < 0.80 \quad (12)$$

$$0.50 < fp1/f2 < 5.00 \quad (13)$$

$$0.50 < fp2/f2 < 10.0 \quad (14)$$

$$1.50 < f1/f < 45.0 \quad (15)$$

$$0.50 < f2/f < 1.50 \quad (16)$$

$$2.00 < |f3|/f < 35.0 \quad (17)$$

$$0.50 < Fno < 2.50 \quad (18)$$

A distance, on the optical axis, between an image-side lens surface of the first positive lens and the aperture stop is referred to as DL1, and a distance, on the optical axis, between an object-side lens surface of the second positive lens and the aperture stop is referred to as DL2. A refractive index of the material of the first positive lens at the d-line is referred to as nd1.

A height through which the chief paraxial ray passes the first positive lens is referred to as h1^, and a height through which the chief paraxial ray passes the second positive lens is referred to as h2^. Note that the chief paraxial ray is a paraxial ray, among the rays incident on the optical axis at an angle of −45° when a focal length of the optical system as a whole is normalized to 1, that passes an intersection between an incident pupil and the optical axis of the optical system. When measured from the optical axis, the angle of incidence of the optical system is positive in the clockwise direction and is negative in the counterclockwise direction. Furthermore, it is assumed that the object is on the left side of the optical system, and the ray that is incident on the optical system and that is from the object side proceeds from the left side towards the right side.

A height through which the paraxial marginal ray passes the first positive lens is referred to as h1, and a height through which the paraxial marginal ray passes the second positive lens is referred to as h2. Note that the paraxial marginal ray is a paraxial ray that is, when a focal length of the optical system as a whole is normalized to 1, incident on the optical system in a parallel manner with respect to the optical axis of the optical system and that has a height of 1 from the optical axis.

The Abbe constant of the material of the first positive lens is referred to as vd1, and the Abbe constant of the material of the second positive lens is referred to as vd2. The focal length of the first positive lens is referred to as fp1, and the focal length of the second positive lens is referred to as fp2. The focal length of the optical system is referred to as f, the focal length of the first lens unit is referred to as f1, and the focal length of the second lens unit is referred to as f2. Furthermore, in a case in which the third lens unit that has a positive or negative refractive power is disposed on the image side with respect to the second lens unit, the focal length of the third lens unit is referred to as f3. A distance, on the optical axis, between a lens surface of the second lens unit closest to the object and a lens surface of the second lens unit closest to the image is referred to as D2. An aperture ratio (F-number) of the optical system is referred to as Fno.

Conditional expression (3) is an expression expressing the symmetry in the arrangement of the first positive lens and the second positive lens with respect to the aperture stop. The value of conditional expression (3) being 1 indicates a state in which materials each having anomalous partial dispersibility are disposed in a symmetrical manner with the aperture stop interposed in between. It is not desirable that the upper limit of conditional expression (3) is exceeded and that the lower limit thereof is subceeded since the balance between the corrections of the on-axis chromatic aberration and the chromatic aberration of magnification is lost and at least one of the corrections become insufficient.

Conditional expression (4) defines a range of the refractive index of the first positive lens that allows the correction of the chromatic aberration to be performed without excessively increasing the Petzval sum of the entire system. It is not desirable that the value of conditional expression (4)

falls below the lower limit and the refractive index of the first positive lens becomes small since the Petzval sum of the system as a whole becomes large and the field curvature becomes degraded. It is difficult to obtain a material that exceeds the upper limit of conditional expression (4).

Conditional expression (5) is an expression expressing the symmetry of the height of the chief paraxial rays each pass through the first positive lens and the second positive lens. It is not desirable that the upper limit of conditional expression (5) is exceeded and that the lower limit thereof is subceeded since the balance between the corrections of the on-axis chromatic aberration and the chromatic aberration of magnification is lost and either one becomes degraded.

Conditional expression (6) defines a ratio between an effect of correcting the chromatic aberration of magnification of the first positive lens at the g-line and an effect of correcting the chromatic aberration of magnification of the second positive lens at the g-line. It is not desirable that the value of conditional expression (6) falls below the lower limit and the effect of correcting the chromatic aberration of magnification with the first positive lens becomes large since it will be difficult to sufficiently cancel the chromatic aberration of magnification, which has been corrected excessively with the first positive lens, with the second positive lens. It is not desirable that the value of conditional expression (6) exceeds the upper limit and the effect of correcting the chromatic aberration of magnification with the first positive lens becomes small since the correction of the chromatic aberration of magnification of the system as a whole becomes insufficient. Furthermore, the above is not desirable since the correction of the on-axis chromatic aberration becomes difficult.

Conditional expression (7) defines the Abbe constant of the first positive lens, and conditional expression (8) defines the Abbe constant of the second positive lens. It is not desirable that the values of conditional expressions (7) and (8) fall below the lower limits since the refractive index of the material that can be generally selected becomes low and the size of the optical system becomes large. When the upper limits of conditional expressions (7) and (8) are exceeded, typically, the refractive index of the material that can be generally selected becomes high. Accordingly, the above is not desirable since the Petzval sum of the system as a whole is increased and the field curvature becomes degraded.

Conditional expression (9) defines the arrangement of the first positive lens, and conditional expression (10) defines the arrangement of the second positive lens. It is difficult to obtain an optical system in which the values of conditional expressions (9) and (10) fall below the lower limits. It is not desirable that the values of conditional expressions (9) and (10) exceed the upper limits and the first positive lens and the second positive lens are disposed away from the aperture stop since the overall lens length of the second lens unit becomes large and, accordingly, the optical system as a whole becomes large in size.

Conditional expression (11) defines the arrangement of the first positive lens in the second lens unit, and conditional expression (12) defines the arrangement of the second positive lens in the second lens unit. By satisfying conditional expressions (11) and (12), the effects of correcting the chromatic aberrations of the first positive lens and the second positive lens can be obtained in a well-balanced manner. It is difficult to obtain an optical system in which the values of conditional expressions (11) and (12) fall below the lower limits. It is not desirable that the values of conditional expressions (11) and (12) exceed the upper limits since the balance between the effects of correcting the chromatic aberrations are lost and either one of the on-axis chromatic aberration and the chromatic aberration of magnification becomes degraded.

Conditional expression (13) defines the refractive power of the first positive lens. It is not desirable that the value of conditional expression (13) falls below the lower limit, the focal length of the first positive lens becomes short, and the refractive power becomes strong since the Petzval sum in the optical system becomes large and it will be difficult to correct the field curvature. It is not desirable that the value of conditional expression (13) exceeds the upper limit, the focal length of the first positive lens becomes long, and the refractive power becomes small since it will be difficult to sufficiently correct the on-axis chromatic aberration correction.

Conditional expression (14) defines the refractive power of the second positive lens. It is not desirable that the value of conditional expression (14) falls below the lower limit, the focal length of the second positive lens becomes short, and the refractive power becomes strong since the Petzval sum in the optical system becomes large and it will be difficult to correct the field curvature. It is not desirable that the value of conditional expression (14) exceeds the upper limit, the focal length of the second positive lens becomes long, and the refractive power becomes small since it will be difficult to sufficiently cancel the chromatic aberration of magnification that has been extensively corrected by the first positive lens and the chromatic aberration of magnification of the system as a whole becomes corrected excessively.

Conditional expression (15) defines the ratio between the focal length of the first lens unit and the focal length of the optical system. When the value of conditional expression (15) falls below the lower limit, when the focal length of the first lens unit becomes short, and when the refractive power becomes strong, the refractive power on the image side becomes weaker than that of the second lens unit. The above is not desirable since the focus sensitivity of the second lens unit becomes poor, the moving length of the second lens unit during focusing from infinity to an object at near distance becomes long, and the optical system becomes large in size. Furthermore, the above is not desirable since various aberrations including chromatic aberration, spherical aberration, and field curvature become degraded because of the strong refractive power of the first lens unit. It is not desirable that the value of conditional expression (15) exceeds the upper limit, the focal length of the first lens unit becomes long, and the refractive power becomes weak since the diameter of the second lens unit becomes large and the optical system as a whole becomes large in size.

Conditional expression (16) defines the ratio between the focal length of the second lens unit and the focal length of the optical system. When the value of conditional expression (16) exceeds the upper limit, when the focal length of the second lens unit becomes long, and when the refractive power becomes weak, the focus sensitivity becomes poor. The above is not desirable since the moving amount of the second lens unit during focusing from infinity to an object at near distance becomes large and the optical system becomes large in size. It is not desirable that the value of conditional expression (16) falls below the lower limit, the focal length of the second lens unit becomes short, and the refractive power becomes strong since aberration fluctuation during focusing becomes large.

Conditional expression (17) defines, in a case in which the third lens unit is disposed on the image side of the second lens unit, the ratio between an absolute value of the focal length of the third lens unit and the focal length of the optical system. It is not desirable that the value of conditional expression (17) falls below the lower limit, the absolute value of the focal length of the third lens unit becomes small, and the refractive power of the third lens unit becomes strong since the field curvature becomes degraded. Furthermore, the above is not desirable since, in order to favorably correct the various aberrations including the degraded field curvature, the number of lenses disposed in the third lens unit increases, the third lens unit becomes large in size, and the optical system becomes large in size. It is not desirable that the value of conditional expression (17) exceeds the upper limit, the absolute value of the focal length of the third lens unit becomes large, and the refractive power of the third lens unit becomes weak, since the refractive power of the second lens unit becomes strong and the second lens unit becomes large in size.

Conditional expression (18) defines the F-number of the optical system. It is difficult to obtain an optical system in which the value of conditional expression (18) falls below the lower limit. When the value of conditional expression (18) exceeds the upper limit, it will be unlikely that the on-axis chromatic aberration and the chromatic aberration of magnification will occur; accordingly, it will be unlikely that the issue of favorably correcting the various aberrations including the chromatic aberration will occur.

By satisfying at least one of conditional expressions (3) to (18), the optical system of an example embodiment of the disclosure can obtain high optical performance while favorably correcting the chromatic aberrations throughout the entire object length.

In one embodiment, numerical ranges of conditional expressions (3) to (18) may be set as follows.

$$1.00 < DL1/DL2 < 2.50 \tag{3a}$$

$$1.82 < nd1 < 2.10 \tag{4a}$$

$$-4.00 < h1\hat{}/h2\hat{} < -1.00 \tag{5a}$$

$$-15.0 < (h1 \times h1\hat{}/vd1/fp1 \times \Delta\theta gF1)/(h2 \times h2\hat{}/vd2/fp2 \times \Delta\theta gF2) < -0.10 \tag{6a}$$

$$10.0 < vd1 < 28.0 \tag{7a}$$

$$10.0 < vd2 < 28.0 \tag{8a}$$

$$0.10 < DL1/f < 0.80 \tag{9a}$$

$$0.10 < DL2/f < 0.50 \tag{10a}$$

$$0.20 < DL1/D2 < 0.70 \tag{11a}$$

$$0.10 < DL2/D2 < 0.60 \tag{12a}$$

$$0.70 < fp1/f2 < 4.00 \tag{13a}$$

$$1.00 < fp2/f2 < 7.00 \tag{14a}$$

$$2.00 < f1/f < 40.0 \tag{15a}$$

$$0.70 < f2/f < 1.30 \tag{16a}$$

$$3.00 < |f3|/f < 30.0 \tag{17a}$$

$$0.50 < Fno < 2.00 \tag{18a}$$

In another embodiment, the numerical ranges of conditional expressions (3) to (18) may be set as follows.

$$1.50 < DL1/DL2 < 2.30 \tag{3b}$$

$$1.85 < nd1 < 2.00 \tag{4b}$$

$$-3.50 < h1\hat{}/h2\hat{} < -2.00 \tag{5b}$$

$$-13.0 < (h1 \times h1\hat{}/vd1/fp1 \times \Delta\theta gF1)/(h2 \times h2\hat{}/vd2/fp2 \times \Delta\theta gF2) < -0.40 \tag{6b}$$

$$15.0 < vd1 < 25.0 \tag{7b}$$

$$15.0 < vd2 < 25.0 \tag{8b}$$

$$0.20 < DL1/f < 0.50 \tag{9b}$$

$$0.10 < DL2/f < 0.03 \tag{10b}$$

$$0.30 < DL1/D2 < 0.60 \tag{11b}$$

$$0.20 < DL2/D2 < 0.40 \tag{12b}$$

$$1.00 < fp1/f2 < 2.50 \tag{13b}$$

$$1.50 < fp2/f2 < 6.00 \tag{14b}$$

$$2.40 < f1/f < 30.0 \tag{15b}$$

$$0.90 < f2/f < 1.20 \tag{16b}$$

$$4.00 < |f3|/f < 25.0 \tag{17b}$$

$$1.00 < Fno < 1.50 \tag{18b}$$

Furthermore, in the optical system of the example embodiment, the second lens unit includes at least one negative lens. The above facilitates correction of the chromatic aberration. Furthermore, in order to favorably correct the on-axis chromatic aberration, the second lens unit includes a cemented lens having a positive lens (at least either of the first positive lens, the second positive lens, and a positive lens other than the first and second positive lenses) and a negative lens.

Optical systems according to the example embodiments of the disclosure will be described next in detail. Note that the $n^{th}$ lens counted from the object side is denoted as Gn.

First Example Embodiment

FIG. 1 is a cross-sectional view of an optical system OL of a first example embodiment. FIG. 2A is a longitudinal aberration drawing when the optical system OL is focusing to infinity, and FIG. 2B is a longitudinal aberration drawing when the optical system OL is focusing an object at closest distance. The optical system OL of the first example embodiment is a medium telephoto lens having a large aperture ratio in which Fno is 1.24 and the focal length is 86.5 mm.

A plurality of lens units constituting the optical system OL of the first example embodiment includes, disposed in order from the object side towards the image side, a first lens unit L1 having a positive refractive power, a second lens unit L2 having a positive refractive power, and a third lens unit L3 having a positive refractive power. The second lens unit L2 includes, disposed in order from the object side towards the image side, a positive lens Lp1 serving as a first positive lens, an aperture stop SP, and a positive lens Lp2 serving as a second positive lens.

The second lens unit L2 moves towards the object side during focusing from an object at infinity to an object at near distance.

The positive lens Lp1 is a lens (G3) disposed closest to the object in the second lens unit L2 and the positive lens Lp2 is a lens (G9) disposed second closest to the image in the second lens unit L2.

By configuring the positive lens Lp1 with a material having high anomalous partial dispersibility and the positive lens Lp2 with a material having high anomalous partial dispersibility, as illustrated in FIGS. 2A and 2B, an optical system in which various aberrations including the on-axis chromatic aberration and the chromatic aberration of magnification are favorably corrected across the entire object length can be obtained.

Second Example Embodiment

Figure 4B:
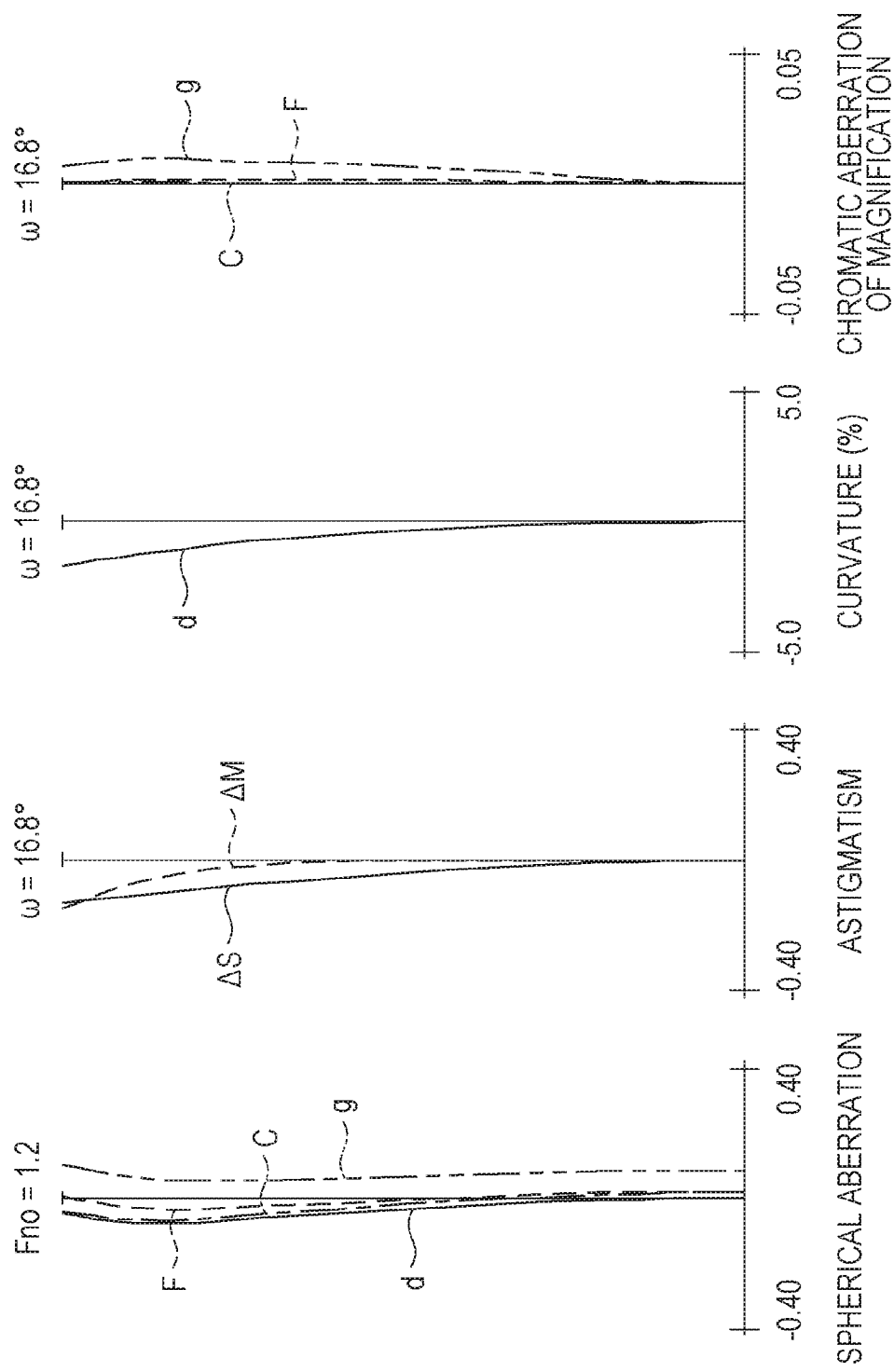
FIG. 4B is a longitudinal aberration drawing when the optical system is focused to an object at closest distance.

FIG. 3 is a cross-sectional view of an optical system OL of a second example embodiment. FIG. 4A is a longitudinal aberration drawing when the optical system OL is focusing to infinity, and FIG. 4B is a longitudinal aberration drawing when the optical system OL is focusing an object at closest distance. The optical system OL of the second example embodiment is a medium telephoto lens having a large aperture ratio in which Fno is 1.24 and the focal length is 71.5 mm.

A plurality of lens units constituting the optical system OL of the second example embodiment includes, disposed in order from the object side towards the image side, a first lens unit L1 having a positive refractive power, a second lens unit L2 having a positive refractive power, and a third lens unit L3 having a positive refractive power. The second lens unit L2 includes, disposed in order from the object side towards the image side, a positive lens Lp1 serving as a first positive lens, an aperture stop SP, and a positive lens Lp2 serving as a second positive lens.

The second lens unit L2 moves towards the object side during focusing from an object at infinity to an object at near distance.

The positive lens Lp1 is a lens (G4) disposed closest to the object in the second lens unit L2 and the positive lens Lp2 is a lens (G10) disposed second closest to the image in the second lens unit L2.

By configuring the positive lens Lp1 with a material having high anomalous partial dispersibility and the positive lens Lp2 with a material having high anomalous partial dispersibility, as illustrated in FIGS. 4A and 4B, an optical system in which various aberrations including the on-axis chromatic aberration and the chromatic aberration of magnification are favorably corrected across the entire object length can be obtained.

Third Example Embodiment

Figure 5:
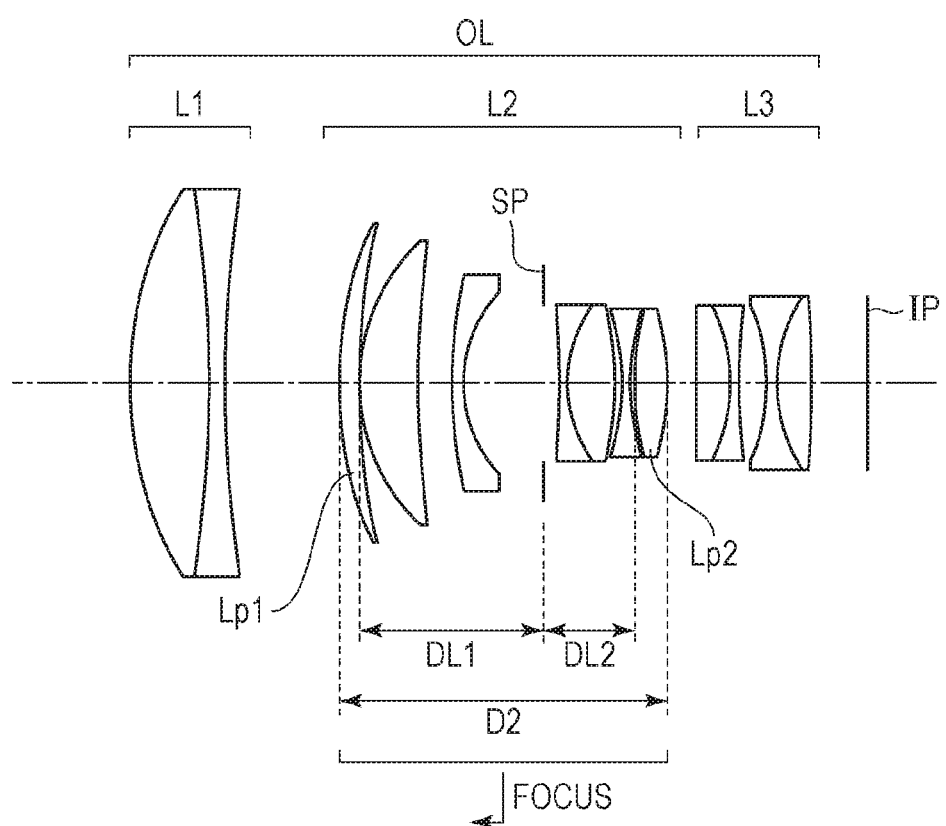
FIG. 5 is a cross-sectional view of an optical system of a third example embodiment.
Figure 6A:
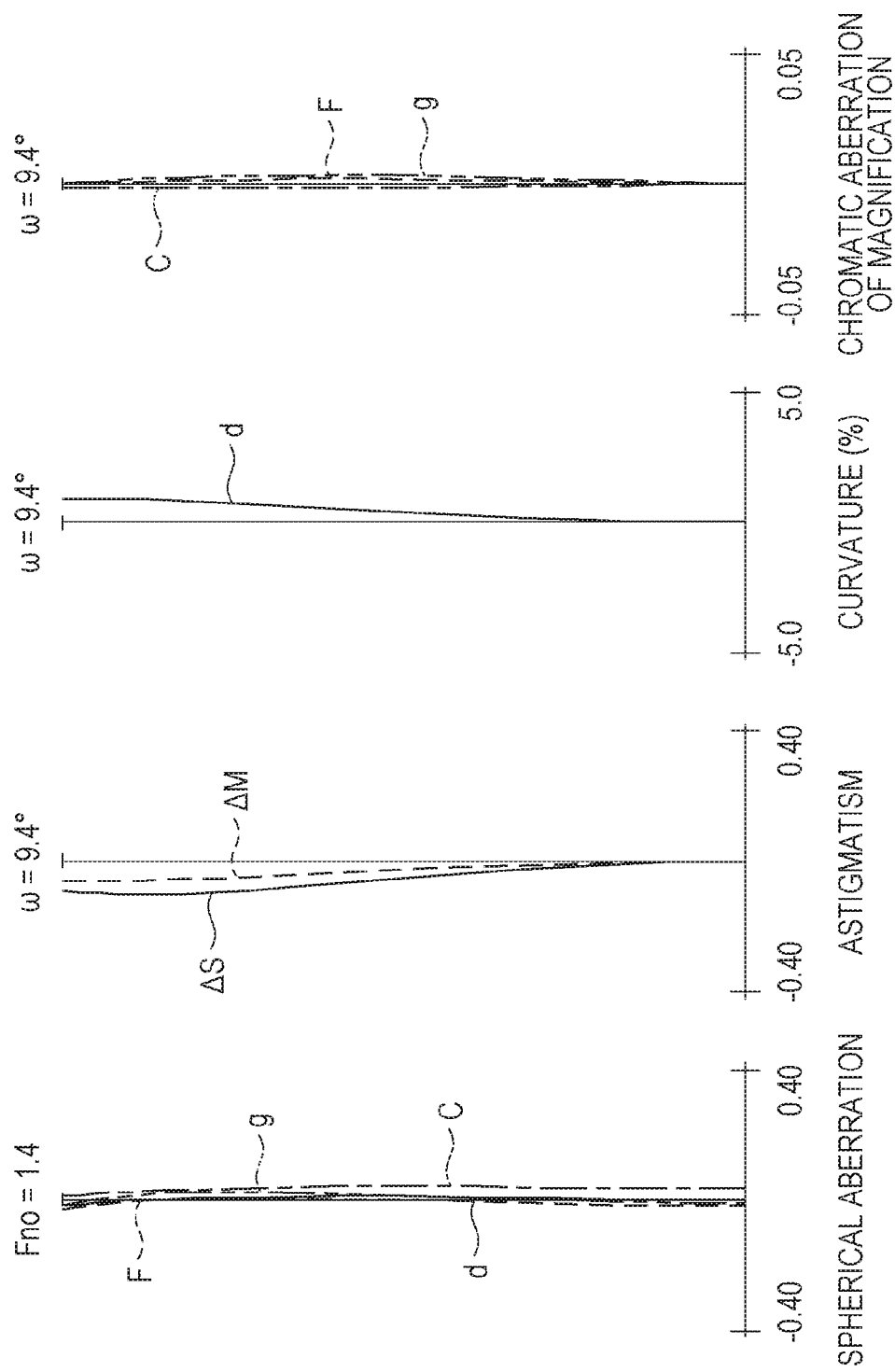
FIG. 6A is a longitudinal aberration drawing when the optical system is focused to infinity.
Figure 6B:
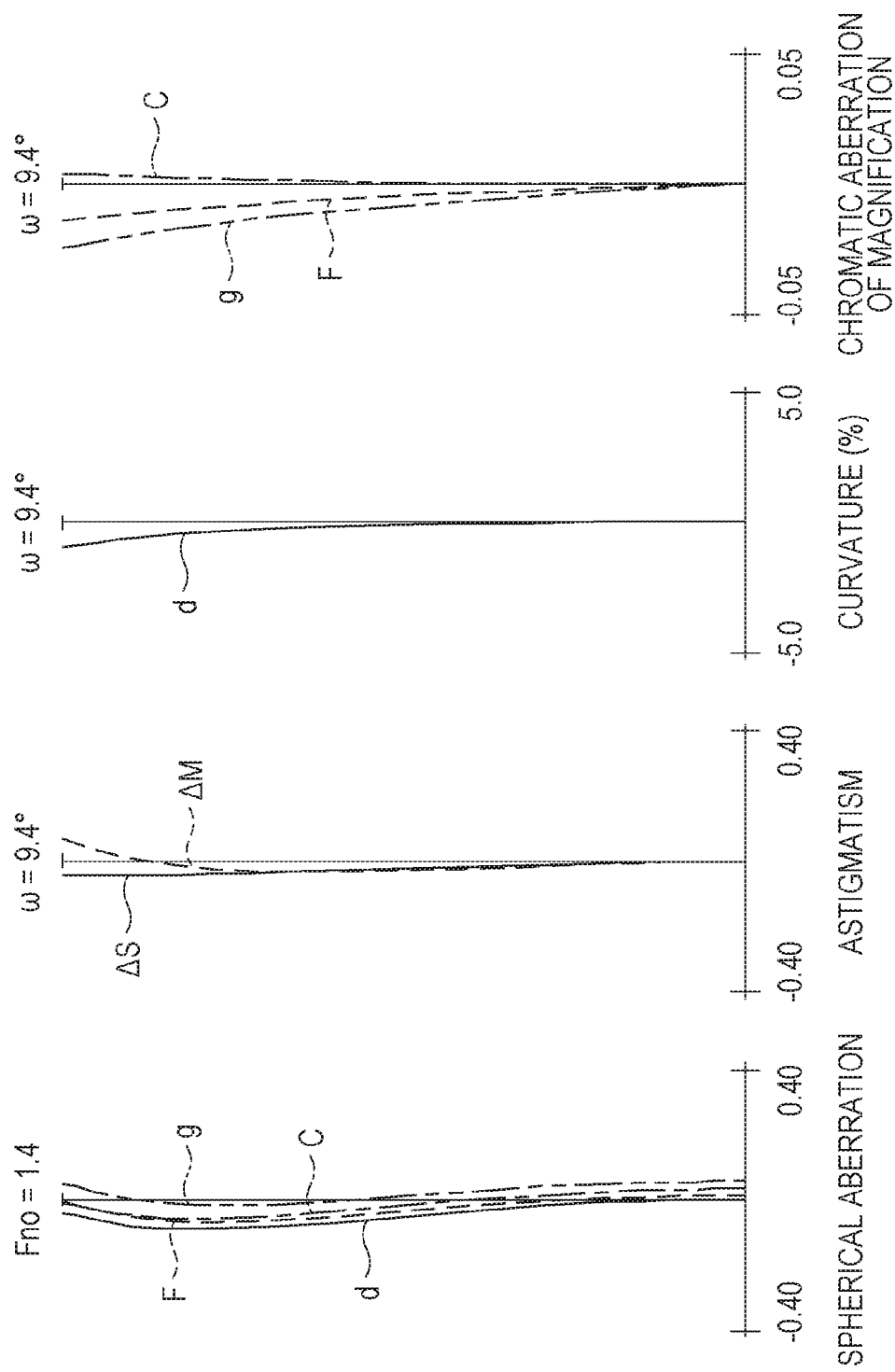
FIG. 6B is a longitudinal aberration drawing when the optical system is focused to an object at closest distance.

FIG. 5 is a cross-sectional view of an optical system OL of a third example embodiment. FIG. 6A is a longitudinal aberration drawing when the optical system OL is focusing to infinity, and FIG. 6B is a longitudinal aberration drawing when the optical system OL is focusing an object at closest distance. The optical system OL of the third example embodiment is a medium telephoto lens having a large aperture ratio in which Fno is 1.41 and the focal length is 131.0 mm.

A plurality of lens units constituting the optical system OL of the third example embodiment includes, disposed in order from the object side towards the image side, a first lens unit L1 having a positive refractive power, a second lens unit L2 having a positive refractive power, and a third lens unit L3 having a negative refractive power. The second lens unit L2 includes, disposed in order from the object side towards the image side, a positive lens Lp1 serving as a first positive lens, an aperture stop SP, and a positive lens Lp2 serving as a second positive lens.

The second lens unit L2 moves towards the object side during focusing from an object at infinity to an object at near distance.

The positive lens Lp1 is a lens (G3) disposed closest to the object in the second lens unit L2 and the positive lens Lp2 is a lens (G9) disposed second closest to the image in the second lens unit L2.

By configuring the positive lens Lp1 with a material having high anomalous partial dispersibility and the positive lens Lp2 with a material having high anomalous partial dispersibility, as illustrated in FIGS. 6A and 6B, an optical system in which various aberrations including the on-axis chromatic aberration and the chromatic aberration of magnification are favorably corrected across the entire object length can be obtained.

Fourth Example Embodiment

Figure 7:
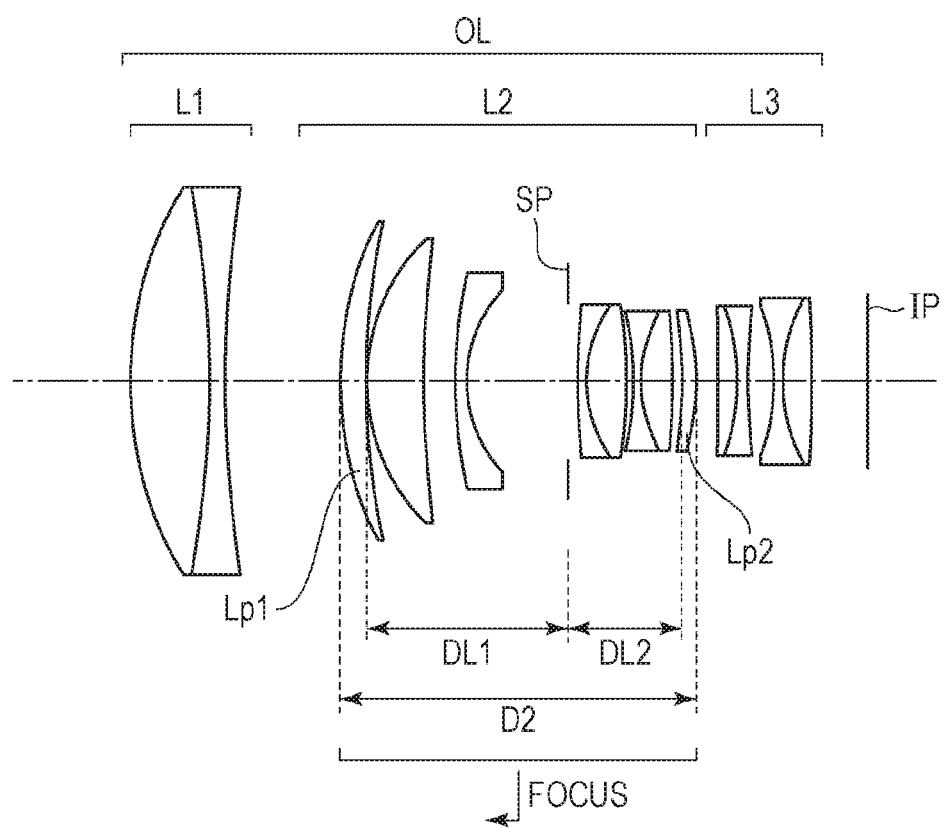
FIG. 7 is a cross-sectional view of an optical system of a fourth example embodiment.

FIG. 7 is a cross-sectional view of an optical system OL of a fourth example embodiment. FIG. 8A is a longitudinal aberration drawing when the optical system OL is focusing to infinity, and FIG. 8B is a longitudinal aberration drawing when the optical system OL is focusing an object at closest distance. The optical system OL of the fourth example embodiment is a medium telephoto lens having a large aperture ratio in which Fno is 1.41 and the focal length is 131.0 mm.

A plurality of lens units constituting the optical system OL of the fourth example embodiment includes, disposed in order from the object side towards the image side, a first lens unit L1 having a positive refractive power, a second lens unit L2 having a positive refractive power, and a third lens unit L3 having a negative refractive power. The second lens unit L2 includes, disposed in order from the object side towards the image side, a positive lens Lp1 serving as a first positive lens, an aperture stop SP, and a positive lens Lp2 serving as a second positive lens.

The second lens unit L2 moves towards the object side during focusing from an object at infinity to an object at near distance.

The positive lens Lp1 is a lens (G3) disposed closest to the object in the second lens unit L2 and the positive lens Lp2 is a lens (G10) disposed closest to the image in the second lens unit L2.

By configuring the positive lens Lp1 with a material having high anomalous partial dispersibility and the positive lens Lp2 with a material having high anomalous partial dispersibility, as illustrated in FIGS. 8A and 8B, an optical system in which various aberrations including the on-axis chromatic aberration and the chromatic aberration of magnification are favorably corrected across the entire object length can be obtained.

Fifth Example Embodiment

Figure 9:
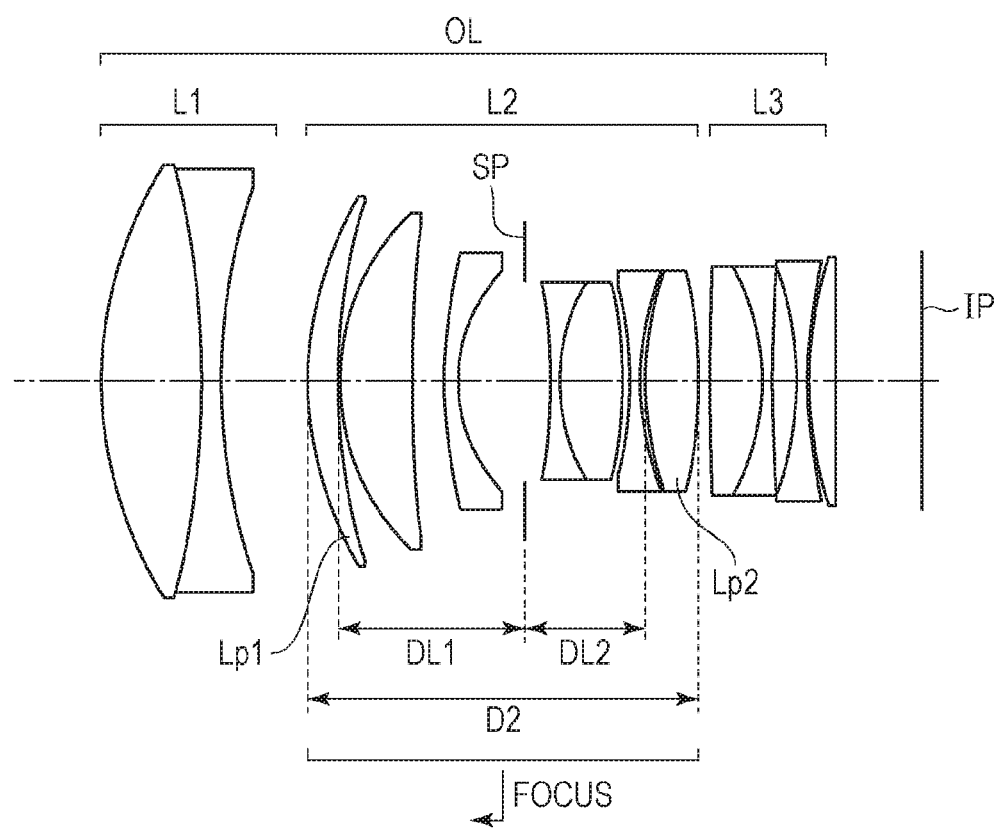
FIG. 9 is a cross-sectional view of an optical system of a fifth example embodiment.
Figure 10A:
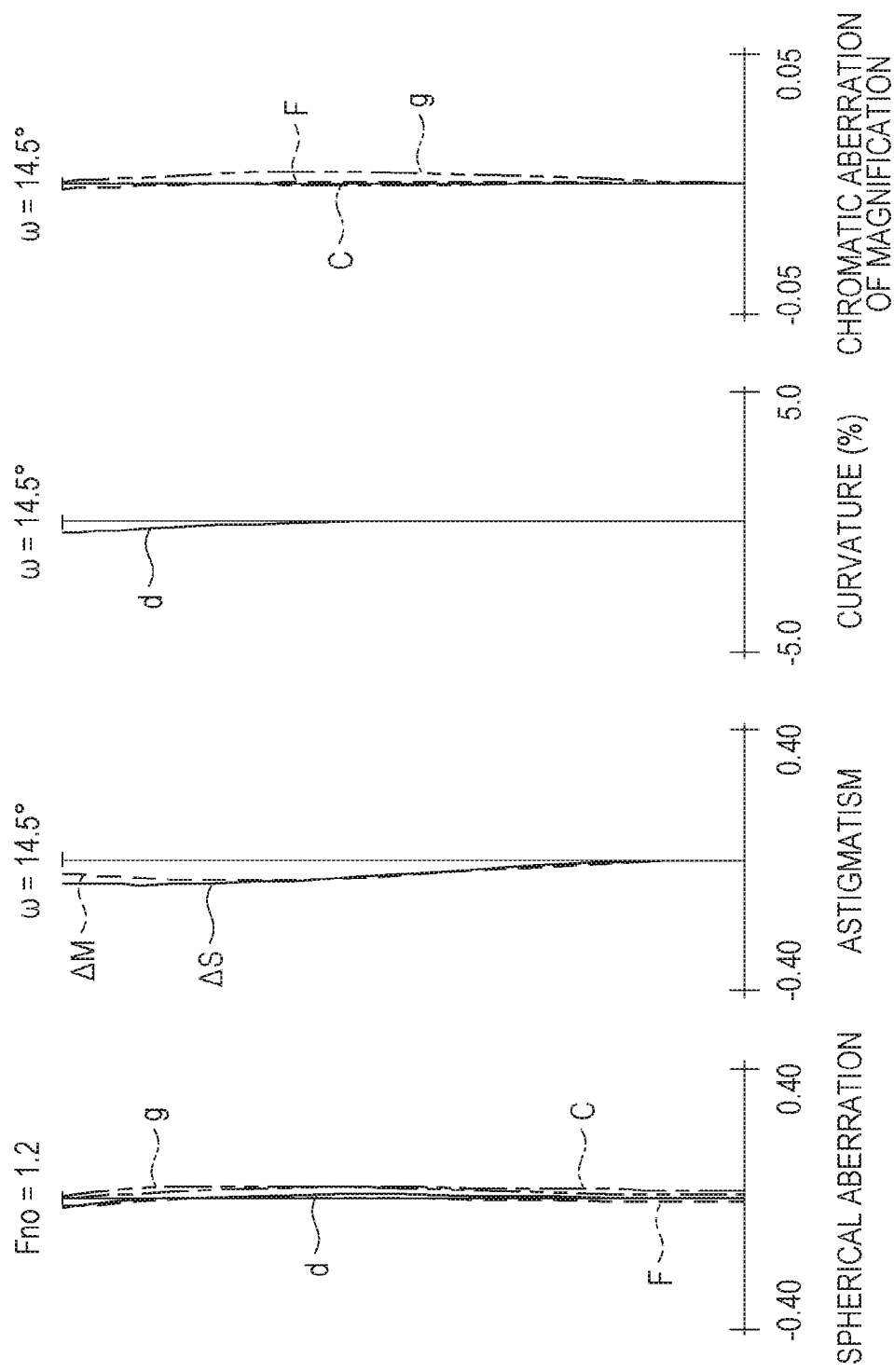
FIG. 10A is a longitudinal aberration drawing when the optical system is focused to infinity.

FIG. 9 is a cross-sectional view of an optical system OL of a fifth example embodiment. FIG. 10A is a longitudinal aberration drawing when the optical system OL is focusing to infinity, and FIG. 10B is a longitudinal aberration drawing when the optical system OL is focusing an object at closest distance. The optical system OL of the fifth example embodiment is a medium telephoto lens having a large aperture ratio in which Fno is 1.24 and the focal length is 86.9 mm.

A plurality of lens units constituting the optical system OL of the fifth example embodiment includes, disposed in order from the object side towards the image side, a first lens unit L1 having a positive refractive power, a second lens unit L2 having a positive refractive power, and a third lens unit L3 having a negative refractive power. The second lens unit L2 includes, disposed in order from the object side towards the image side, a positive lens Lp1 serving as a first positive lens, an aperture stop SP, and a positive lens Lp2 serving as a second positive lens.

The second lens unit L2 moves towards the object side during focusing from an object at infinity to an object at near distance.

The positive lens Lp1 is a lens (G3) disposed closest to the object in the second lens unit L2 and the positive lens Lp2 is a lens (G9) disposed second closest to the image in the second lens unit L2.

By configuring the positive lens Lp1 with a material having high anomalous partial dispersibility and the positive lens Lp2 with a material having high anomalous partial dispersibility, as illustrated in FIGS. 10A and 10B, an optical system in which various aberrations including the on-axis chromatic aberration and the chromatic aberration of magnification are favorably corrected across the entire object length can be obtained.

Sixth Example Embodiment

Figure 11:
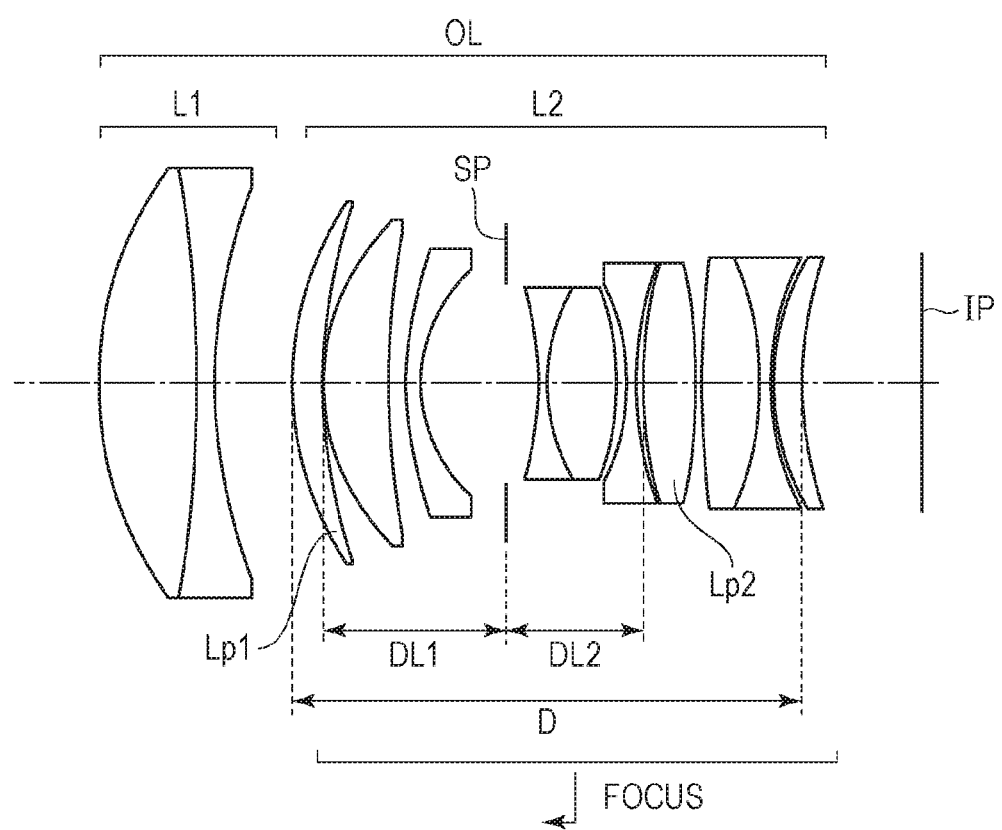
FIG. 11 is a cross-sectional view of an optical system of a sixth example embodiment.
Figure 12B:
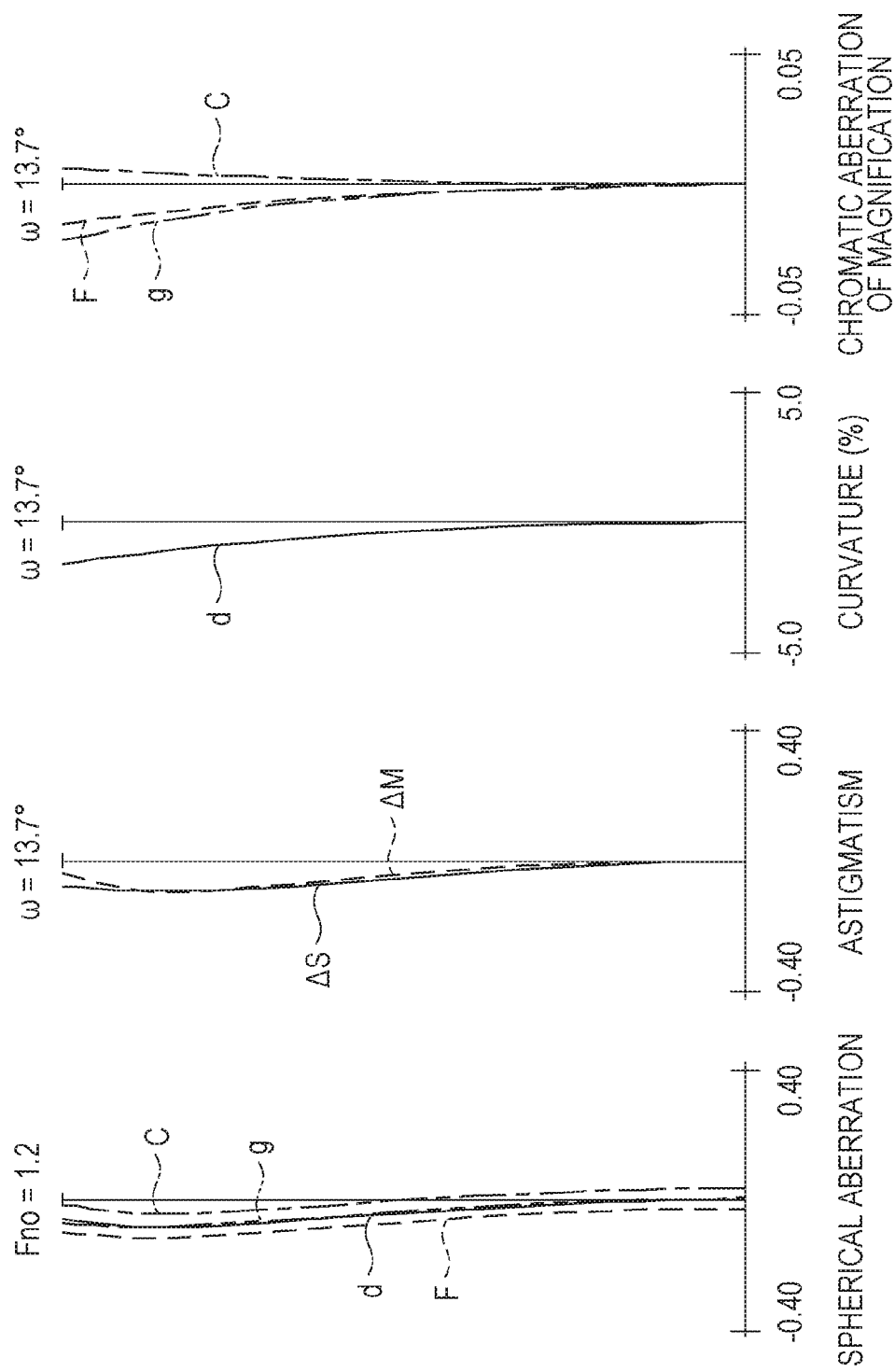
FIG. 12B is a longitudinal aberration drawing when the optical system is focused to an object at closest distance.

FIG. 11 is a cross-sectional view of an optical system OL of a sixth example embodiment. FIG. 12A is a longitudinal aberration drawing when the optical system OL is focusing to infinity, and FIG. 12B is a longitudinal aberration drawing when the optical system OL is focusing an object at closest distance. The optical system OL of the sixth example embodiment is a medium telephoto lens having a large aperture ratio in which Fno is 1.24 and the focal length is 86.3 mm.

A plurality of lens units constituting the optical system OL of the sixth example embodiment includes, disposed in order from the object side towards the image side, a first lens unit L1 having a positive refractive power and a second lens unit L2 having a positive refractive power. The second lens unit L2 includes, disposed in order from the object side towards the image side, a positive lens Lp1 serving as a first positive lens, an aperture stop SP, and a positive lens Lp2 serving as a second positive lens.

The second lens unit L2 moves towards the object side during focusing from an object at infinity to an object at near distance.

The positive lens Lp1 is a lens (G3) disposed closest to the object in the second lens unit L2 and the positive lens Lp2 is a lens (G9) disposed relatively close to the image in the second lens unit L2.

By configuring the positive lens Lp1 with a material having high anomalous partial dispersibility and the positive lens Lp2 with a material having high anomalous partial dispersibility, as illustrated in FIGS. 12A and 12B, an optical system in which various aberrations including the on-axis chromatic aberration and the chromatic aberration of magnification are favorably corrected across the entire object length can be obtained.

Numerical Embodiments

Hereinafter, first to sixth numerical embodiments corresponding to the first to sixth example embodiments will be illustrated. Furthermore, in the first to sixth numerical embodiments, the surface number indicates the order of the optical surface from the object side. Sign R is a curvature radius (mm) of an optical surface, d in a surface number i is a distance (mm) between an $i^{th}$ optical surface and an $i+1^{th}$ optical surface, Nd is a refractive index of a material of an optical member at a d-line, and BF is a back focus. Sign vd is an Abbe constant of a material of an optical member with a d-line as a reference and the definition thereof is as described above.

Furthermore, mark * is attached to the right side of the surface number when the optical surface is an aspherical surface. The shape of the aspherical surface is expressed by $$x=(h^2/R)/[1+\{1-(1+K)(h/R)^2\}^{1/2}+B\times h^4+C\times h^6+D\times h^8+E\times h^{10},$$

where x is a displacement amount from a surface vertex in an optical axis direction, h is a height from an optical axis in a direction orthogonal to the optical axis, R is a paraxial curvature radius, K is a conic constant, B, C, D, and E are aspherical coefficients of each order. Note that "E±XX" in each aspherical coefficient means "×10±$^{XX}$". Physical quantities used in the conditional expressions described above in the first to sixth numerical embodiments are indicated in Table 1, and values corresponding to the conditional expressions described above are indicated in Table 2.

First Numerical Embodiment

| | UNIT mm | | | | |
|---|---|---|---|---|---|
| SURFACE NUMBER | R | d | Nd | vd | EFFECTIVE RAY DIAMETER |
| 1 | 71.655 | 15.57 | 1.61800 | 63.4 | 70.20 |
| 2 | −149.456 | 3.00 | 1.72047 | 34.7 | 70.20 |
| 3 | 112.469 | (VARIABLE) | | | 64.63 |
| 4 | 67.332 | 5.75 | 1.92286 | 20.9 | 61.52 |
| 5 | 141.236 | 0.30 | | | 60.60 |
| 6 | 39.868 | 11.43 | 1.49700 | 81.5 | 55.00 |
| 7 | 200.860 | 6.51 | | | 52.72 |
| 8* | 75.484 | 2.50 | 1.85478 | 24.8 | 41.24 |
| 9 | 27.701 | 10.68 | | | 35.16 |
| 10 (APERTURE STOP) | ∞ | 4.51 | | | 33.10 |
| 11 | −85.831 | 1.50 | 1.85478 | 24.8 | 31.67 |
| 12 | 33.313 | 9.50 | 1.88300 | 40.8 | 31.20 |
| 13 | −68.563 | 2.28 | | | 30.88 |
| 14 | −48.430 | 1.70 | 1.54072 | 47.2 | 29.85 |
| 15 | 58.169 | 1.00 | 1.60401 | 20.8 | 34.00 |
| 16 | 77.751 | 6.95 | 1.95375 | 32.3 | 34.22 |
| 17 | −77.751 | (VARIABLE) | | | 35.40 |

-continued

| UNIT mm | | | | | |
|---|---|---|---|---|---|
| 18 | 204.839 | 7.00 | 1.95375 | 32.3 | 36.85 |
| 19 | −48.060 | 2.20 | 1.62004 | 36.3 | 37.03 |
| 20 | 97.164 | 5.40 | | | 36.40 |
| 21 | −52.101 | 1.65 | 1.68893 | 31.1 | 36.44 |
| 22 | 237.864 | 0.15 | | | 38.49 |
| 23 | 97.826 | 4.00 | 1.90043 | 37.4 | 39.55 |
| 24 | −370.202 | (VARIABLE) | | | 39.79 |
| IMAGE PLANE | ∞ | | | | |

ASPHERICAL SURFACE DATA

| CONIC CONSTANT K | FOURTH ORDER COEFFICIENT B | SIXTH ORDER COEFFICIENT C | EIGHTH ORDER COEFFICIENT D | TENTH ORDER COEFFICIENT E |
|---|---|---|---|---|
| | | EIGHTH SURFACE | | |
| 0.0000E+00 | −2.2875E−06 | −2.1286E−10 | 2.6709E−13 | 0.0000E+00 |

VARIOUS DATA

| | |
|---|---|
| FOCAL LENGTH | 86.53 |
| Fno | 1.24 |
| HALF FIELD ANGLE (DEGREE) | 14.04 |
| IMAGE HEIGHT | 21.64 |
| OVERALL LENS LENGTH | 134.49 |
| BF | 14.91 |
| INCIDENT PUPIL POSITION | 113.67 |
| EXIT PUPIL POSITION | −38.04 |
| FRONT PRINCIPAL POINT POSITION | 58.81 |
| REAR PRINCIPAL POINT POSITION | −71.62 |

VARIABLE SPACING

| | |
|---|---|
| d3 | 14.36 |
| d17 | 1.64 |

UNIT DATA

| UNIT | STARTING SURFACE | FOCAL LENGTH | LENS STRUCTURE LENGTH | FRONT PRINCIPAL POINT POSITION | REAR PRINCIPAL POINT POSITION |
|---|---|---|---|---|---|
| 1 | 1 | 452.25 | 18.57 | −35.96 | −43.85 |
| 2 | 4 | 93.07 | 64.61 | 33.60 | −40.88 |
| 3 | 18 | 845.67 | 20.40 | −30.01 | −42.39 |

SINGLE LENS ELEMENT DATA

| LENS | STARTING SURFACE | FOCAL LENGTH |
|---|---|---|
| 1 | 1 | 80.540 |
| 2 | 2 | −88.650 |
| 3 | 4 | 134.410 |
| 4 | 6 | 97.780 |
| 5 | 8 | −52.460 |
| 6 | 11 | −27.910 |
| 7 | 12 | 26.550 |
| 8 | 14 | −48.600 |
| 9 | 15 | 375.170 |
| 10 | 16 | 41.670 |
| 11 | 18 | 41.370 |
| 12 | 19 | −51.560 |
| 13 | 21 | −61.890 |
| 14 | 23 | 86.280 |

Second Numerical Embodiment

UNIT mm

| SURFACE NUMBER | R | d | Nd | vd | EFFECTIVE RAY DIAMETER |
|---|---|---|---|---|---|
| 1 | −1138.145 | 4.00 | 1.49700 | 81.5 | 68.00 |
| 2 | −214.828 | 2.02 | | | 67.31 |
| 3 | −127.510 | 3.00 | 1.54814 | 45.8 | 67.18 |
| 4 | 55.168 | 0.36 | | | 62.76 |
| 5 | 56.148 | 13.46 | 1.59349 | 67.0 | 62.82 |
| 6 | −272.562 | (VARIABLE) | | | 62.26 |
| 7 | 65.476 | 3.61 | 1.89286 | 20.4 | 59.02 |
| 8 | 101.465 | 0.15 | | | 58.60 |
| 9 | 40.646 | 12.72 | 1.49700 | 81.5 | 56.02 |
| 10 | 425.820 | 10.53 | | | 54.07 |
| 11* | 67.059 | 2.50 | 1.85478 | 24.8 | 39.10 |
| 12 | 29.596 | 9.56 | | | 34.55 |
| 13 (APERTURE STOP) | ∞ | 4.31 | | | 33.30 |
| 14 | −99.074 | 1.50 | 1.69895 | 30.1 | 32.37 |
| 15 | 30.811 | 8.02 | 1.80400 | 46.6 | 32.06 |
| 16 | −79.612 | 1.80 | | | 31.85 |
| 17 | −51.867 | 1.70 | 1.71736 | 29.5 | 31.30 |
| 18 | 40.919 | 1.50 | 1.60401 | 20.8 | 33.72 |
| 19 | 59.136 | 6.79 | 1.95375 | 32.3 | 34.00 |
| 20 | −59.136 | (VARIABLE) | | | 34.80 |
| 21 | 95.420 | 6.88 | 1.88300 | 40.8 | 37.39 |
| 22 | −51.595 | 2.20 | 1.56732 | 42.8 | 37.38 |
| 23 | 58.097 | 7.40 | | | 35.92 |
| 24 | −42.217 | 1.65 | 1.58144 | 40.8 | 35.97 |
| 25 | −2529.799 | 0.15 | | | 38.21 |
| 26 | 105.125 | 3.00 | 2.00100 | 29.1 | 39.55 |
| 27 | 696.276 | (VARIABLE) | | | 39.70 |
| IMAGE PLANE | ∞ | | | | |

ASPHERICAL SURFACE DATA

| CONIC CONSTANT K | FOURTH ORDER COEFFICIENT B | SIXTH ORDER COEFFICIENT C | EIGHTH ORDER COEFFICIENT D | TENTH ORDER COEFFICIENT E |
|---|---|---|---|---|
| ELEVENTH SURFACE | | | | |
| 0.0000E+00 | −3.5252E−06 | −1.7616E−09 | 6.4515E−13 | 0.0000E+00 |

VARIOUS DATA

| | |
|---|---|
| FOCAL LENGTH | 71.50 |
| Fno | 1.24 |
| HALF FIELD ANGLE (DEGREE) | 16.84 |
| IMAGE HEIGHT | 21.64 |
| OVERALL LENS LENGTH | 136.26 |
| BF | 13.49 |
| INCIDENT PUPIL POSITION | 87.71 |
| EXIT PUPIL POSITION | −36.75 |
| FRONT PRINCIPAL POINT POSITION | 57.46 |
| REAR PRINCIPAL POINT POSITION | −58.01 |

VARIABLE SPACING

| | |
|---|---|
| d6 | 10.95 |
| d20 | 3.02 |

UNIT DATA

| UNIT | STARTING SURFACE | FOCAL LENGTH | LENS STRUCTURE LENGTH | FRONT PRINCIPAL POINT POSITION | REAR PRINCIPAL POINT POSITION |
|---|---|---|---|---|---|
| 1 | 1 | 2010.25 | 22.84 | 56.60 | 42.26 |
| 2 | 7 | 83.50 | 64.69 | 34.86 | −43.11 |
| 3 | 21 | 918.02 | 21.28 | −79.01 | −87.16 |

-continued

| UNIT mm | | |
|---|---|---|
| SINGLE LENS ELEMENT DATA | | |
| LENS | STARTING SURFACE | FOCAL LENGTH |
| 1 | 1 | 532.06 |
| 2 | 3 | −69.85 |
| 3 | 5 | 79.66 |
| 4 | 7 | 197.42 |
| 5 | 9 | 89.43 |
| 6 | 11 | −63.94 |
| 7 | 14 | −33.47 |
| 8 | 15 | 28.55 |
| 9 | 17 | −31.64 |
| 10 | 18 | 213.30 |
| 11 | 19 | 31.90 |
| 12 | 21 | 38.78 |
| 13 | 22 | −47.82 |
| 14 | 24 | −73.86 |
| 15 | 26 | 123.38 |

Third Numerical Embodiment

| UNIT mm | | | | | |
|---|---|---|---|---|---|
| SURFACE NUMBER | R | d | Nd | vd | EFFECTIVE RAY DIAMETER |
| 1 | 93.730 | 19.68 | 1.59282 | 68.6 | 92.64 |
| 2 | −282.917 | 3.80 | 1.80610 | 33.3 | 91.12 |
| 3 | 291.338 | (VARIABLE) | | | 87.70 |
| 4 | 94.864 | 4.99 | 1.92286 | 18.9 | 76.92 |
| 5 | 172.469 | 0.18 | | | 76.27 |
| 6 | 48.867 | 14.40 | 1.49700 | 81.5 | 68.99 |
| 7 | 260.068 | 8.36 | | | 66.53 |
| 8* | 106.172 | 3.00 | 1.85478 | 24.8 | 51.60 |
| 9 | 33.463 | 19.71 | | | 43.58 |
| 10 (APERTURE STOP) | ∞ | 3.95 | | | 38.61 |
| 11 | −177.170 | 2.00 | 1.69895 | 30.1 | 37.34 |
| 12 | 32.258 | 11.56 | 1.72916 | 54.7 | 36.01 |
| 13 | −79.189 | 1.90 | | | 35.29 |
| 14 | −53.982 | 2.00 | 1.71700 | 47.9 | 34.56 |
| 15 | 52.584 | 1.00 | 1.60401 | 20.8 | 33.94 |
| 16 | 67.339 | 8.13 | 1.91082 | 35.3 | 33.92 |
| 17 | −65.641 | (VARIABLE) | | | 35.15 |
| 18 | 13043.336 | 8.21 | 1.6968 | 55.5 | 36.64 |
| 19 | −43.123 | 2.30 | 1.48749 | 70.2 | 37.00 |
| 20 | 157.620 | 6.80 | | | 36.77 |
| 21 | −47.693 | 2.50 | 1.48749 | 70.2 | 36.90 |
| 22 | 38.707 | 8.63 | 1.64000 | 60.1 | 40.68 |
| 23 | −250.661 | (VARIABLE) | | | 41.00 |
| IMAGE PLANE | ∞ | | | | |

| ASPHERICAL SURFACE DATA | | | | |
|---|---|---|---|---|
| CONIC CONSTANT K | FOURTH ORDER COEFFICIENT B | SIXTH ORDER COEFFICIENT C | EIGHTH ORDER COEFFICIENT D | TENTH ORDER COEFFICIENT E |
| EIGHTH SURFACE | | | | |
| 0.0000E+00 | −1.0341E−06 | −1.0439E−11 | 3.6372E−14 | 0.0000E+00 |

| VARIOUS DATA | |
|---|---|
| FOCAL LENGTH | 131.00 |
| Fno | 1.41 |
| HALF FIELD ANGLE (DEGREE) | 9.38 |
| IMAGE HEIGHT | 21.64 |
| OVERALL LENS LENGTH | 182.28 |
| BF | 13.66 |
| INCIDENT PUPIL POSITION | 203.13 |

-continued

| UNIT mm | |
|---|---|
| EXIT PUPIL POSITION | −50.86 |
| FRONT PRINCIPAL POINT POSITION | 68.15 |
| REAR PRINCIPAL POINT POSITION | −117.34 |

| VARIABLE SPACING | |
|---|---|
| d3 | 28.21 |
| d17 | 7.30 |

| UNIT DATA | | | | | |
|---|---|---|---|---|---|
| UNIT | STARTING SURFACE | FOCAL LENGTH | LENS STRUCTURE LENGTH | FRONT PRINCIPAL POINT POSITION | REAR PRINCIPAL POINT POSITION |
| 1 | 1 | 321.34 | 23.48 | −15.87 | −28.92 |
| 2 | 4 | 134.24 | 81.19 | 56.44 | −40.97 |
| 3 | 18 | −599.31 | 28.44 | 10.99 | −9.49 |

| SINGLE LENS ELEMENT DATA | | |
|---|---|---|
| LENS | STARTING SURFACE | FOCAL LENGTH |
| 1 | 1 | 121.12 |
| 2 | 2 | −177.53 |
| 3 | 4 | 221.61 |
| 4 | 6 | 118.39 |
| 5 | 8 | −58.27 |
| 6 | 11 | −38.89 |
| 7 | 12 | 32.87 |
| 8 | 14 | −36.86 |
| 9 | 15 | 387.43 |
| 10 | 16 | 37.59 |
| 11 | 18 | 61.70 |
| 12 | 19 | −69.20 |
| 13 | 21 | −43.42 |
| 14 | 22 | 53.01 |

Fourth Numerical Embodiment

| UNIT mm | | | | | |
|---|---|---|---|---|---|
| SURFACE NUMBER | R | d | Nd | vd | EFFECTIVE RAY DIAMETER |
| 1 | 96.747 | 19.45 | 1.59282 | 68.6 | 92.64 |
| 2 | −266.533 | 3.80 | 1.80610 | 33.3 | 91.19 |
| 3 | 279.509 | (VARIABLE) | | | 87.82 |
| 4 | 89.897 | 6.34 | 1.89286 | 20.4 | 78.00 |
| 5 | 198.679 | 0.15 | | | 77.27 |
| 6 | 49.365 | 13.93 | 1.49700 | 81.5 | 69.10 |
| 7 | 233.752 | 7.96 | | | 66.62 |
| 8* | 132.469 | 3.00 | 1.85478 | 24.8 | 52.99 |
| 9 | 34.502 | 24.74 | | | 44.60 |
| 10 (APERTURE STOP) | ∞ | 2.60 | | | 37.65 |
| 11 | 374.702 | 2.00 | 1.72825 | 28.5 | 36.37 |
| 12 | 30.787 | 10.05 | 1.72916 | 54.7 | 34.45 |
| 13 | −103.672 | 1.51 | | | 33.48 |
| 14 | −74.493 | 2.00 | 1.72047 | 34.7 | 32.64 |
| 15 | 34.769 | 7.66 | 1.76182 | 26.5 | 30.95 |
| 16 | −154.919 | 2.43 | | | 31.95 |
| 17 | −95.585 | 3.50 | 1.80810 | 22.8 | 32.68 |
| 18 | −63.407 | (VARIABLE) | | | 33.66 |
| 19 | −623.111 | 4.93 | 1.88300 | 40.8 | 35.40 |
| 20 | −50.035 | 2.30 | 1.48749 | 70.2 | 35.68 |
| 21 | 164.745 | 6.85 | | | 35.62 |
| 22 | −50.699 | 2.50 | 1.72825 | 28.5 | 35.85 |
| 23 | 49.073 | 6.43 | 2.00100 | 29.1 | 39.48 |
| 24 | −315.413 | (VARIABLE) | | | 39.78 |
| IMAGE PLANE | ∞ | | | | |

UNIT mm

ASPHERICAL SURFACE DATA

| CONIC CONSTANT K | FOURTH ORDER COEFFICIENT B | SIXTH ORDER COEFFICIENT C | EIGHTH ORDER COEFFICIENT D | TENTH ORDER COEFFICIENT E |
|---|---|---|---|---|
| EIGHTH SURFACE | | | | |
| 0.0000E+00 | −7.4725E−07 | 1.0692E−10 | −2.8576E−15 | 0.0000E+00 |

VARIOUS DATA

| | |
|---|---|
| FOCAL LENGTH | 131.00 |
| Fno | 1.41 |
| HALF FIELD ANGLE (DEGREE) | 9.38 |
| IMAGE HEIGHT | 21.64 |
| OVERALL LENS LENGTH | 182.28 |
| BF | 13.87 |
| INCIDENT PUPIL POSITION | 229.03 |
| EXIT PUPIL POSITION | −43.24 |
| FRONT PRINCIPAL POINT POSITION | 59.55 |
| REAR PRINCIPAL POINT POSITION | −117.13 |

VARIABLE SPACING

| | |
|---|---|
| d3 | 28.90 |
| d18 | 5.39 |

UNIT DATA

| UNIT | STARTING SURFACE | FOCAL LENGTH | LENS STRUCTURE LENGTH | FRONT PRINCIPAL POINT POSITION | REAR PRINCIPAL POINT POSITION |
|---|---|---|---|---|---|
| 1 | 1 | 363.42 | 23.25 | −18.57 | −31.31 |
| 2 | 4 | 137.20 | 87.86 | 50.90 | −53.87 |
| 3 | 19 | −587.65 | 23.01 | 16.18 | 0.130 |

SINGLE LENS ELEMENT DATA

| LENS | STARTING SURFACE | FOCAL LENGTH |
|---|---|---|
| 1 | 1 | 122.17 |
| 2 | 2 | −168.73 |
| 3 | 4 | 178.97 |
| 4 | 6 | 122.84 |
| 5 | 8 | −55.36 |
| 6 | 11 | −46.17 |
| 7 | 12 | 33.61 |
| 8 | 14 | −32.65 |
| 9 | 15 | 37.94 |
| 10 | 17 | 222.28 |
| 11 | 19 | 61.36 |
| 12 | 20 | −78.45 |
| 13 | 22 | −33.88 |
| 14 | 23 | 42.80 |

Fifth Numerical Embodiment

UNIT mm

| SURFACE NUMBER | R | d | Nd | vd | EFFECTIVE RAY DIAMETER |
|---|---|---|---|---|---|
| 1 | 65.713 | 16.54 | 1.59349 | 67.0 | 70.09 |
| 2 | −153.487 | 0.28 | | | 68.97 |
| 3 | −148.684 | 3.00 | 1.65412 | 39.7 | 68.76 |
| 4 | 94.660 | (VARIABLE) | | | 63.67 |
| 5 | 60.504 | 4.82 | 1.92286 | 20.9 | 60.04 |
| 6 | 103.550 | 0.35 | | | 59.28 |

-continued

| UNIT mm | | | | | |
|---|---|---|---|---|---|
| 7 | 38.788 | 12.08 | 1.49700 | 81.5 | 54.44 |
| 8 | 244.919 | 5.13 | | | 52.03 |
| 9* | 65.338 | 2.50 | 1.85478 | 24.8 | 41.34 |
| 10 | 26.734 | 10.91 | | | 35.07 |
| 11 (APERTURE STOP) | ∞ | 4.36 | | | 33.00 |
| 12 | −93.907 | 1.60 | 1.80518 | 25.4 | 31.56 |
| 13 | 32.496 | 10.41 | 1.88300 | 40.8 | 30.88 |
| 14 | −69.585 | 1.18 | | | 30.21 |
| 15 | −59.713 | 1.60 | 1.72047 | 34.7 | 29.49 |
| 16 | 44.503 | 1.00 | 1.60401 | 20.8 | 33.10 |
| 17 | 54.706 | 8.83 | 2.00100 | 29.1 | 33.38 |
| 18 | −81.260 | (VARIABLE) | | | 34.99 |
| 19 | 1158.100 | 8.55 | 2.00100 | 29.1 | 36.22 |
| 20 | −39.531 | 1.80 | 1.63980 | 34.5 | 36.75 |
| 21 | 294.896 | 3.97 | | | 36.30 |
| 22 | −53.221 | 1.90 | 1.80518 | 25.4 | 36.30 |
| 23 | 86.786 | 0.15 | | | 38.50 |
| 24 | 65.251 | 4.46 | 2.00100 | 29.1 | 39.67 |
| 25 | −5158.427 | (VARIABLE) | | | 39.83 |
| IMAGE PLANE | ∞ | | | | |

| ASPHERICAL SURFACE DATA | | | | |
|---|---|---|---|---|
| CONIC CONSTANT K | FOURTH ORDER COEFFICIENT B | SIXTH ORDER COEFFICIENT C | EIGHTH ORDER COEFFICIENT D | TENTH ORDER COEFFICIENT E |
| NINTH SURFACE | | | | |
| 0.0000E+00 | −2.8833E−06 | −9.0240E−10 | 5.9797E−13 | 0.0000E+00 |

| VARIOUS DATA | WIDE ANGLE END |
|---|---|
| FOCAL LENGTH | 86.86 |
| Fno | 1.24 |
| HALF FIELD ANGLE (DEGREE) | 13.99 |
| IMAGE HEIGHT | 21.64 |
| OVERALL LENS LENGTH | 136.62 |
| BF | 14.46 |
| INCIDENT PUPIL POSITION | 115.14 |
| EXIT PUPIL POSITION | −35.87 |
| FRONT PRINCIPAL POINT POSITION | 52.10 |
| REAR PRINCIPAL POINT POSITION | −72.40 |

| VARIABLE SPACING | |
|---|---|
| d4 | 14.73 |
| d18 | 2.00 |

| UNIT DATA | | | | | |
|---|---|---|---|---|---|
| UNIT | STARTING SURFACE | FOCAL LENGTH | LENS STRUCTURE LENGTH | FRONT PRINCIPAL POINT POSITION | REAR PRINCIPAL POINT POSITION |
| 1 | 1 | 410.89 | 19.82 | −38.19 | −46.36 |
| 2 | 5 | 87.60 | 64.78 | 34.10 | −37.84 |
| 3 | 19 | −1797.45 | 20.83 | 78.12 | 62.53 |

| SINGLE LENS ELEMENT DATA | | |
|---|---|---|
| LENS | STARTING SURFACE | FOCAL LENGTH |
| 1 | 1 | 79.77 |
| 2 | 3 | −87.99 |
| 3 | 5 | 149.67 |
| 4 | 7 | 90.96 |
| 5 | 9 | −54.57 |
| 6 | 12 | −29.81 |
| 7 | 13 | 26.35 |
| 8 | 15 | −35.17 |
| 9 | 16 | 381.00 |
| 10 | 17 | 33.76 |
| 11 | 19 | 38.32 |
| 12 | 20 | −54.37 |

-continued

| UNIT mm | | |
|---|---|---|
| 13 | 22 | −40.73 |
| 14 | 24 | 64.40 |

Sixth Numerical Embodiment

| UNIT mm | | | | | |
|---|---|---|---|---|---|
| SURFACE NUMBER | R | d | Nd | vd | EFFECTIVE RAY DIAMETER |
| 1 | 60.505 | 16.34 | 1.59349 | 67.0 | 69.63 |
| 2 | −207.421 | 3.00 | 1.65412 | 39.7 | 68.40 |
| 3 | 88.310 | (VARIABLE) | | | 62.99 |
| 4 | 53.957 | 5.13 | 1.92286 | 20.9 | 58.68 |
| 5 | 90.164 | 0.15 | | | 57.79 |
| 6 | 37.089 | 10.81 | 1.49700 | 81.5 | 52.73 |
| 7 | 138.376 | 2.90 | | | 50.31 |
| 8* | 55.191 | 2.50 | 1.85478 | 24.8 | 42.85 |
| 9 | 25.251 | 14.24 | | | 35.86 |
| 10 (APERTURE STOP) | ∞ | 5.20 | | | 32.09 |
| 11 | −57.334 | 1.60 | 1.85478 | 24.8 | 30.34 |
| 12 | 32.390 | 11.51 | 1.88300 | 40.8 | 30.15 |
| 13 | −44.678 | 1.69 | | | 30.55 |
| 14 | −36.154 | 1.60 | 1.59551 | 39.2 | 31.01 |
| 15 | 57.737 | 1.00 | 1.60401 | 20.8 | 36.36 |
| 16 | 72.799 | 8.84 | 2.00100 | 29.1 | 36.63 |
| 17 | −95.211 | 1.00 | | | 38.42 |
| 18 | 174.149 | 9.63 | 2.00100 | 29.1 | 39.97 |
| 19 | −51.870 | 1.80 | 1.68893 | 31.1 | 40.27 |
| 20 | 45.435 | 0.50 | | | 39.49 |
| 21 | 41.529 | 4.75 | 1.85135 | 40.1 | 40.20 |
| 22* | 68.796 | (VARIABLE) | | | 39.60 |
| IMAGE PLANE | ∞ | | | | |

| ASPHERICAL SURFACE DATA | | | | |
|---|---|---|---|---|
| CONIC CONSTANT K | FOURTH ORDER COEFFICIENT B | SIXTH ORDER COEFFICIENT C | EIGHTH ORDER COEFFICIENT D | TENTH ORDER COEFFICIENT E |
| EIGHTH SURFACE | | | | |
| 0.0000E+00 | −2.0271E−06 | −6.9347E−10 | 3.1021E−13 | 0.0000E+00 |
| TWENTY-SECOND SURFACE | | | | |
| 0.0000E+00 | 1.3060E−06 | 3.1589E−10 | 1.5276E−12 | 0.0000E+00 |

| VARIOUS DATA | WIDE ANGLE END |
|---|---|
| FOCAL LENGTH | 86.29 |
| Fno | 1.24 |
| ω | 14.08 |
| IMAGE HEIGHT | 21.64 |
| OVERALL LENS LENGTH | 136.97 |
| BF | 20.00 |
| INCIDENT PUPIL POSITION | 116.01 |
| EXIT PUPIL POSITION | −38.35 |
| FRONT PRINCIPAL POINT POSITION | 74.70 |
| REAR PRINCIPAL POINT POSITION | −66.28 |

| VARIABLE SPACING | |
|---|---|
| d3 | 12.79 |
| d22 | 20.00 |

-continued

| UNIT mm | | | | | |
|---|---|---|---|---|---|
| UNIT DATA | | | | | |
| UNIT | STARTING SURFACE | FOCAL LENGTH | LENS STRUCTURE LENGTH | FRONT PRINCIPAL POINT POSITION | REAR PRINCIPAL POINT POSITION |
| 1 | 1 | 331.96 | 19.34 | −30.69 | −39.14 |
| 2 | 4 | 81.59 | 84.83 | 47.72 | −40.38 |

| SINGLE LENS ELEMENT DATA | | |
|---|---|---|
| LENS | STARTING SURFACE | FOCAL LENGTH |
| 1 | 1 | 80.76 |
| 2 | 2 | −94.31 |
| 3 | 4 | 136.33 |
| 4 | 6 | 98.46 |
| 5 | 8 | −56.63 |
| 6 | 11 | −24.02 |
| 7 | 12 | 22.87 |
| 8 | 14 | −37.10 |
| 9 | 15 | 450.73 |
| 10 | 16 | 42.33 |
| 11 | 18 | 40.80 |
| 12 | 19 | −34.89 |
| 13 | 21 | 113.96 |

TABLE 1

| | First Numerical Embodiment | Second Numerical Embodiment | Third Numerical Embodiment | Fourth Numerical Embodiment | Fifth Numerical Embodiment | Sixth Numerical Embodiment |
|---|---|---|---|---|---|---|
| ΔθgF1 | 0.008 | 0.007 | 0.011 | 0.007 | 0.008 | 0.008 |
| ΔθgF2 | 0.092 | 0.092 | 0.092 | 0.007 | 0.092 | 0.092 |
| vd1 | 20.90 | 20.40 | 18.90 | 20.40 | 20.90 | 20.90 |
| vd2 | 20.80 | 20.80 | 20.80 | 20.80 | 22.80 | 20.80 |
| nd1 | 1.9229 | 1.8929 | 1.9229 | 1.8929 | 1.9229 | 1.9229 |
| h1^ | −0.83 | −0.88 | −0.94 | −1.12 | −0.80 | −0.83 |
| h2^ | 0.35 | 0.31 | 0.28 | 0.37 | 0.33 | 0.39 |
| h1 | 0.87 | 1.02 | 0.82 | 0.83 | 0.85 | 0.84 |
| h2 | 0.38 | 0.48 | 0.34 | 0.28 | 0.38 | 0.38 |
| f | 86.53 | 71.50 | 131.00 | 131.00 | 86.86 | 86.29 |
| f1 | 452.25 | 2010.25 | 321.34 | 363.42 | 410.89 | 331.96 |
| f2 | 93.07 | 83.50 | 134.24 | 137.20 | 87.60 | 81.59 |
| f3 | 845.67 | 918.02 | −599.31 | −587.65 | −1797.45 | — |
| fp1 | 134.41 | 197.42 | 221.61 | 178.97 | 149.67 | 136.33 |
| fp2 | 375.17 | 213.30 | 387.43 | 222.28 | 381.00 | 450.73 |
| D2 | 64.61 | 64.69 | 81.18 | 87.87 | 64.77 | 84.85 |
| DL1 | 31.42 | 35.46 | 45.65 | 49.78 | 30.97 | 30.60 |
| DL2 | 19.49 | 17.33 | 21.41 | 28.25 | 19.15 | 21.60 |
| Fno | 1.24 | 1.24 | 1.41 | 1.41 | 1.24 | 1.24 |

TABLE 2

| | First Numerical Embodiment | Second Numerical Embodiment | Third Numerical Embodiment | Fourth Numerical Embodiment | Fifth Numerical Embodiment | Sixth Numerical Embodiment |
|---|---|---|---|---|---|---|
| (1) | 0.01 | 0.01 | 0.01 | 0.01 | 0.01 | 0.01 |
| (2) | 0.09 | 0.09 | 0.09 | 0.01 | 0.09 | 0.09 |
| (3) | 1.61 | 2.05 | 2.13 | 1.76 | 1.62 | 1.42 |
| (4) | 1.9229 | 1.8929 | 1.9229 | 1.8929 | 1.9229 | 1.9229 |
| (5) | −2.39 | −2.83 | −3.34 | −3.04 | −2.45 | −2.15 |
| (6) | −1.35 | −0.47 | −1.90 | −12.38 | −1.24 | −1.40 |
| (7) | 20.90 | 20.40 | 18.90 | 20.40 | 20.90 | 20.90 |
| (8) | 20.80 | 20.80 | 20.80 | 22.80 | 20.80 | 20.80 |
| (9) | 0.36 | 0.50 | 0.35 | 0.38 | 0.36 | 0.35 |

TABLE 2-continued

|  | First Numerical Embodiment | Second Numerical Embodiment | Third Numerical Embodiment | Fourth Numerical Embodiment | Fifth Numerical Embodiment | Sixth Numerical Embodiment |
|---|---|---|---|---|---|---|
| (10) | 0.23 | 0.24 | 0.16 | 0.22 | 0.22 | 0.25 |
| (11) | 0.49 | 0.55 | 0.56 | 0.57 | 0.48 | 0.36 |
| (12) | 0.30 | 0.27 | 0.26 | 0.32 | 0.30 | 0.25 |
| (13) | 1.44 | 2.36 | 1.65 | 1.30 | 1.71 | 1.67 |
| (14) | 4.03 | 2.55 | 2.89 | 1.62 | 4.35 | 5.52 |
| (15) | 5.23 | 28.12 | 2.45 | 2.77 | 4.73 | 3.85 |
| (16) | 1.08 | 1.17 | 1.02 | 1.05 | 1.01 | 0.95 |
| (17) | 9.77 | 12.84 | 4.57 | 4.49 | 20.69 | — |
| (18) | 1.24 | 1.24 | 1.41 | 1.41 | 1.24 | 1.24 |

Image Pickup Apparatus

Figure 13:
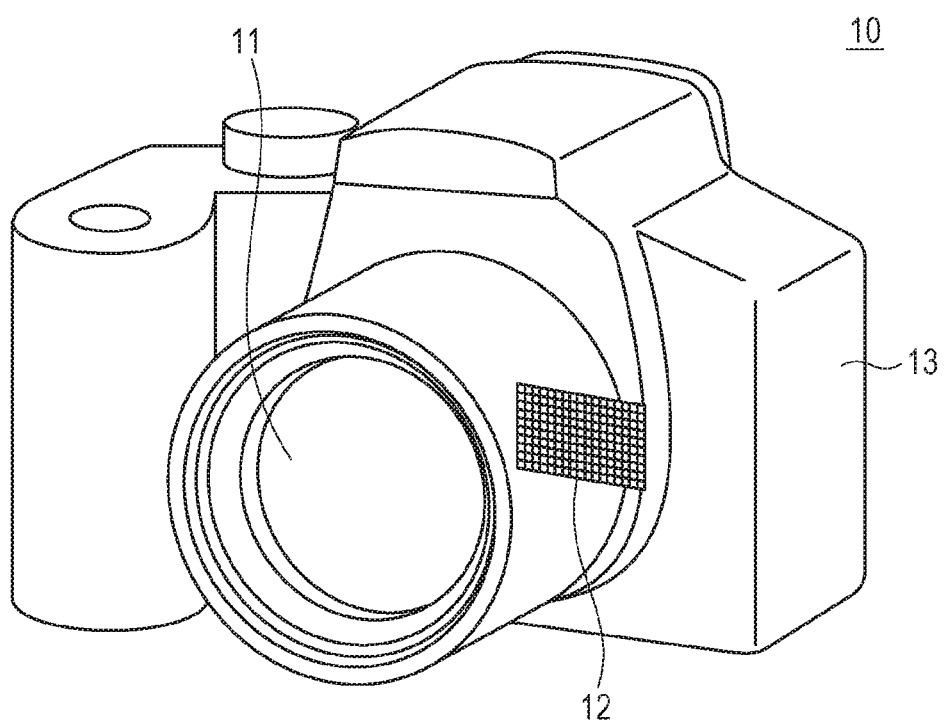
FIG. 13 is a diagram illustrating a configuration of an image pickup apparatus of an example embodiment.

Referring next to FIG. 13, an example embodiment of an image pickup apparatus will be described. FIG. 13 is a diagram illustrating a configuration of an image pickup apparatus 10. The image pickup apparatus 10 includes a camera main body 13, a lens apparatus 11 including the optical system OL including either one of the first to sixth example embodiment described above, and a light receiving element (an image pickup element) 12 that photoelectrically converts an image formed by the optical system OL. An image pickup element such as a CCD sensor or a CMOS sensor can be used as the light receiving element 12. The lens apparatus 11 and the camera main body 13 may be configured integrally or may be configured to be mountable to each other. The image pickup apparatus 10 of the present example embodiment is capable of obtaining high optical performance while favorably correcting chromatic aberrations throughout the entire object length.

Note that the image pickup apparatus 10 of the disclosure is not limited to the digital still camera illustrated in FIG. 13 and may be applied to various image pickup apparatuses such as a television camera, a silver-halide film camera, and a monitoring camera.

While the exemplary embodiments of the disclosure have been described above, the disclosure is not limited to the exemplary embodiments and the examples and may be combined, deformed, and modified within the gist of the disclosure. For example, an image shake correction may be performed in the optical system by moving some of the lenses in a direction containing a component in a direction orthogonal to the optical axis.

While the disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

This application claims the benefit of Japanese Patent Application No. 2018-127359, filed Jul. 4, 2018, which is hereby incorporated by reference herein in its entirety.

What is claimed is:

1. An optical system comprising:
a first lens unit that has a positive refractive power; and
a second lens unit that has a positive refractive power,
wherein a distance between adjacent lens units changes during focusing,
wherein the second lens unit moves towards an object side during focusing from infinity to an object at near distance,
wherein the second lens unit includes, disposed in order from the object side towards an image side, a first positive lens, an aperture stop, and a second positive lens, and
wherein when an anomalous partial dispersibility $\Delta\theta gF$ of a material is represented, using an Abbe constant $vd$ of the material, and a partial dispersion ratio $\theta gF$ of the material, by $$\Delta\theta gF = \theta gF - (-1.665 \times 10^{-7} \times vd^3 + 5.213 \times 10^{-5} \times vd^2 - 5.656 \times 10^{-3} \times vd + 7.278 \times 10^{-1}),$$

the following conditional expressions are satisfied:

$$0.0050 < \Delta\theta gF1 < 0.40; \text{ and}$$

$$0.0050 < \Delta\theta gF2 < 0.40$$

where $\Delta\theta gF1$ is an anomalous partial dispersibility of a material of the first positive lens, and $\Delta\theta gF2$ is an anomalous partial dispersibility of a material of the second positive lens.

2. The optical system according to claim 1, wherein the following conditional expression is satisfied:

$$0.50 < DL1/DL2 < 3.00$$

where DL1 is a distance, on an optical axis, between an image-side lens surface of the first positive lens and the aperture stop, and DL2 is a distance, on the optical axis, between an object-side lens surface of the second positive lens and the aperture stop.

3. The optical system according to claim 1, wherein the following conditional expression is satisfied:

$$1.80 < nd1 < 2.40$$

where $nd1$ is a refractive index of the material of the first positive lens at a d-line.

4. The optical system according to claim 1, wherein the following conditional expression is satisfied:

$$-5.00 < h1\hat{\,}/h2\hat{\,} < -0.50$$

where $h1\hat{\,}$ is a height through which a chief paraxial ray passes the first positive lens, and $h2\hat{\,}$ is a height through which a chief paraxial ray passes the second positive lens.

5. The optical system according to claim 1, wherein the following conditional expression is satisfied:

$$-20.0 < (h1 \times h1\hat{\,}/vd1/fp1\Delta\theta gF1)/(h2 \times h2\hat{\,}/vd2/fp2 \times \Delta\theta gF2) < -0.10$$

where h1 is a height through which a paraxial marginal ray passes the first positive lens, h2 is a height through which a paraxial marginal ray passes the second positive lens, $h1\hat{\,}$ is a height through which a chief paraxial ray passes the first positive lens, $h2\hat{\,}$ is a height through which a chief paraxial ray passes the second positive lens, vd1 is an Abbe constant of the material of the first positive lens, vd2 is an Abbe constant of the material of the second positive lens, fp1 is a focal length of the first positive lens, and fp2 is a focal length of the second positive lens.

6. The optical system according to claim 1, wherein the following conditional expression is satisfied:

$$0.00 < vd1 < 30.0$$

where vd1 is an Abbe constant of the material of the first positive lens.

7. The optical system according to claim 1, wherein the following conditional expression is satisfied:

$$0.00 < vd2 < 30.0$$

wherein vd2 is an Abbe constant of the material of the second positive lens.

8. The optical system according to claim 1, wherein the following conditional expression is satisfied:

$$0.00 < DL1/f < 1.00$$

where DL1 is a distance, on an optical axis, between an image-side lens surface of the first positive lens and the aperture stop, and f is a focal length of the optical system.

9. The optical system according to claim 1, wherein the following conditional expression is satisfied:

$$0.00 < DL2/f < 1.00$$

where DL2 is a distance, on an optical axis, between an object-side lens surface of the second positive lens and the aperture stop, and f is a focal length of the optical system.

10. The optical system according to claim 1, wherein the following conditional expression is satisfied:

$$0.00 < DL1/D2 < 0.80$$

where DL1 is a distance, on an optical axis, between an image-side lens surface of the first positive lens and the aperture stop, and D2 is a distance, on the optical axis, between a lens surface of the second lens unit closest to an object and a lens surface of the second lens unit closest to an image.

11. The optical system according to claim 1, wherein the following conditional expression is satisfied:

$$0.00 < DL2/D2 < 0.80$$

where DL2 is a distance, on an optical axis, between an object-side lens surface of the second positive lens and the aperture stop, and D2 is a distance, on the optical axis, between a lens surface of the second lens unit closest to an object and a lens surface of the second lens unit closest to an image.

12. The optical system according to claim 1, wherein the following conditional expression is satisfied:

$$0.50 < fp1/f2 < 5.00$$

where fp1 is a focal length of the first positive lens, and f2 is a focal length of the second lens unit.

13. The optical system according to claim 1, wherein the following conditional expression is satisfied:

$$0.50 < fp2/f2 < 10.0$$

where fp2 is a focal length of the second positive lens, and f2 is a focal length of the second lens unit.

14. The optical system according to claim 1, wherein the following conditional expression is satisfied:

$$1.50 < f1/f < 45.0$$

where f1 is a focal length of the first lens unit, and f is a focal length of the optical system.

15. The optical system according to claim 1, wherein the following conditional expression is satisfied:

$$0.50 < f2/f < 1.50$$

where f2 is a focal length of the second lens unit, and f is a focal length of the optical system.

16. The optical system according to claim 1, wherein a plurality of lens units that constitute the optical system include, are consisting of, disposed in order from the object side towards the image side, the first lens unit, the second lens unit, and a third lens unit that has a positive or a negative refractive power.

17. The optical system according to claim 16, wherein the following conditional expression is satisfied:

$$2.00 < |f3|/f < 35.0$$

where f3 is a focal length of the third lens unit, and f is a focal length of the optical system.

18. The optical system according to claim 1, wherein a plurality of lens units that constitute the optical system include, are consisting of, disposed in order from the object side towards the image side, the first lens unit and the second lens unit.

19. The optical system according to claim 1, wherein the following conditional expression is satisfied:

$$0.50 < Fno < 2.50$$

where Fno is an aperture ratio of the optical system during focusing to infinity.

20. The optical system according to claim 1, wherein the second lens unit includes a negative lens.

21. An image pickup apparatus comprising:
an optical system; and
a light receiving element that receives an image formed by the optical system,
wherein the optical system includes
a first lens unit that has a positive refractive power; and
a second lens unit that has a positive refractive power,
wherein a distance between adjacent lens units changes during focusing,
wherein the second lens unit moves towards an object side during focusing from infinity to an object at near distance,
wherein the second lens unit includes, disposed in order from the object side towards an image side, a first positive lens, an aperture stop, and a second positive lens, and
wherein when $$\Delta\theta gF = \theta gF - (-1.665 \times 10^{-7} \times vd^3 + 5.213 \times 10^{-5} \times vd^2 - 5.656 \times 10^{-3} \times vd + 7.278 \times 10^{-1})$$

is expressed using an anomalous partial dispersibility $\Delta\theta gF$ of a material, an Abbe constant vd of the material, and a partial dispersion ratio $\theta gF$ of the material, the following conditional expressions hold true:

$$0.0050 < \Delta\theta gF1 < 0.40$$

$$0.0050 < \Delta\theta gF2 < 0.40$$

where $\Delta\theta gF1$ is an anomalous partial dispersibility of a material of the first positive lens, and $\Delta\theta gF2$ is an anomalous partial dispersibility of a material of the second positive lens.

* * * * *